US009189193B2

(12) United States Patent
Kim et al.

(10) Patent No.: US 9,189,193 B2
(45) Date of Patent: Nov. 17, 2015

(54) MOBILE TERMINAL AND CONTROLLING METHOD THEREOF FOR EDITING SECOND GALLERY IMAGE USING EDITING INFORMATION USED FOR PRINTING FIRST GALLERY IMAGE

(71) Applicant: LG ELECTRONICS INC., Seoul (KR)

(72) Inventors: Mina Kim, Seoul (KR); Jihyeon Kim, Seoul (KR); Keansub Lee, Seoul (KR); Yunae Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/336,727

(22) Filed: Jul. 21, 2014

(65) Prior Publication Data

US 2015/0085317 A1 Mar. 26, 2015

(30) Foreign Application Priority Data

Sep. 24, 2013 (KR) ........................ 10-2013-0113146

(51) Int. Cl.
*G06F 3/12* (2006.01)
*G06F 3/0486* (2013.01)
*H04M 1/725* (2006.01)
*H04N 1/00* (2006.01)
*G06K 15/00* (2006.01)
*G06F 3/0488* (2013.01)

(52) U.S. Cl.
CPC ............ *G06F 3/1292* (2013.01); *G06F 3/0486* (2013.01); *G06F 3/1204* (2013.01); *G06F 3/1236* (2013.01); *G06K 15/007* (2013.01); *H04M 1/7253* (2013.01); *H04M 1/72522* (2013.01); *H04N 1/00281* (2013.01); *H04N 1/00442* (2013.01); *G06F 3/0488* (2013.01); *H04M 1/72555* (2013.01); *H04M 2250/22* (2013.01)

(58) Field of Classification Search
CPC ............ H04N 1/00042; H04N 1/0005; H04N 1/00244; H04N 2201/0094
USPC .......................................... 345/173
See application file for complete search history.

(56) References Cited

U.S. PATENT DOCUMENTS

| 2012/0040644 | A1 | 2/2012 | Naik et al. | |
| 2012/0218605 | A1 | 8/2012 | Yamada | |
| 2012/0242683 | A1* | 9/2012 | Asai ............................ | 345/619 |
| 2012/0243024 | A1 | 9/2012 | Miyata | |
| 2012/0306927 | A1* | 12/2012 | Lee et al. ...................... | 345/660 |

FOREIGN PATENT DOCUMENTS

| EP | 2309401 | 4/2011 |
| EP | 2571234 | 3/2013 |
| JP | 2007-193590 | 8/2007 |

OTHER PUBLICATIONS

European Patent Office Application Serial No. 14002567.7, Search Report dated Feb. 9, 2015, 8 pages.

* cited by examiner

*Primary Examiner* — Marcellus Augustin
(74) *Attorney, Agent, or Firm* — Lee, Hong, Degerman, Kang & Waimey

(57) ABSTRACT

A mobile terminal and controlling method thereof are disclosed. The present invention includes a user interface unit configured to receive a user input and a user action, a controller configured to generate a first gallery including a first image saved in the mobile terminal included in a first application and generate a second gallery in response to the user input or the user action by linking the first application to a second application based on printing information on the image, the controller controlling an image printing by controlling a connection to a printable device, an output unit configured to output a second image of the generated second gallery, and a transmitting unit configured to transmit a signal including the outputted second image and a request for printing the second image to the connected printable device.

18 Claims, 28 Drawing Sheets

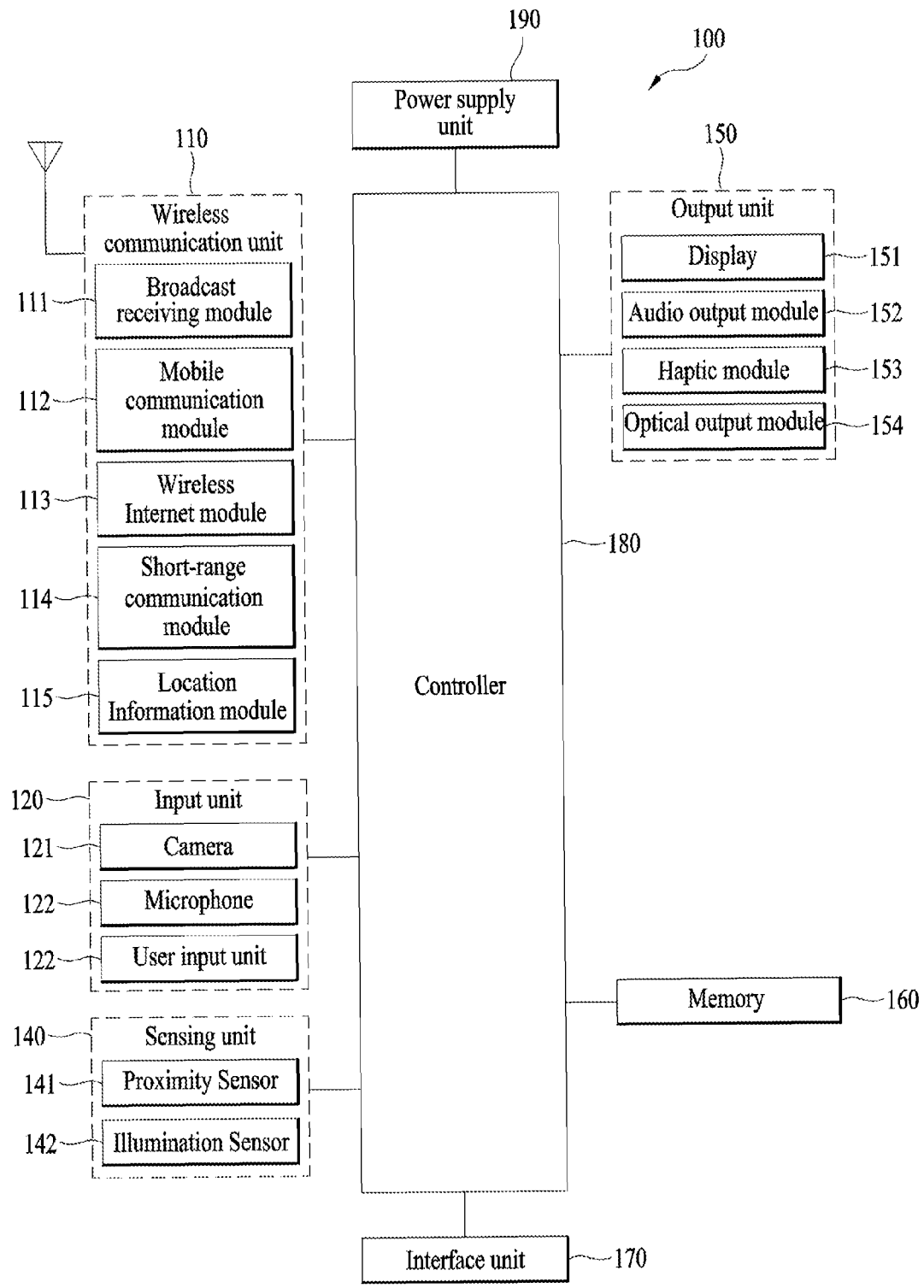

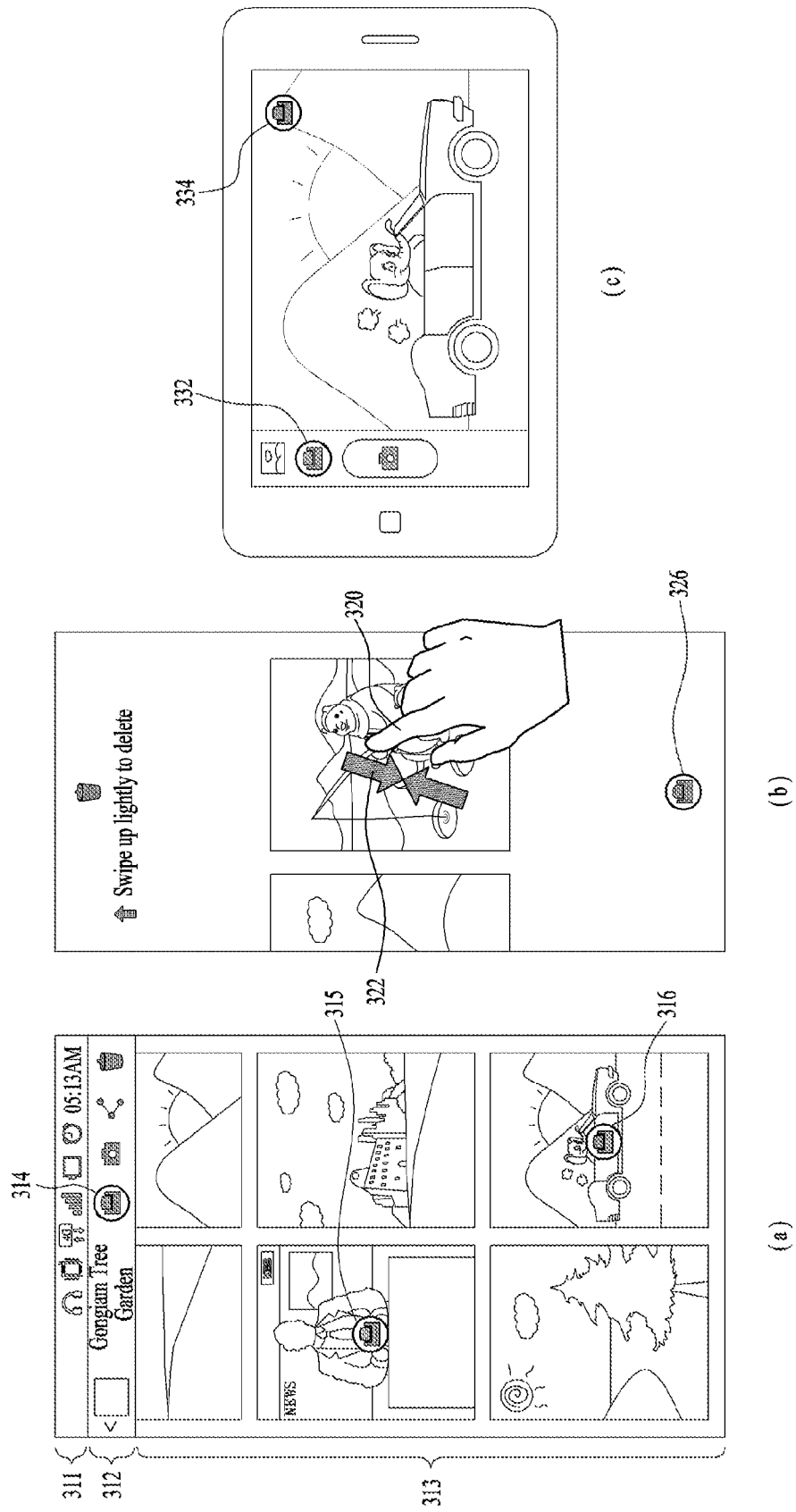

(a)          (b)

FIG. 8
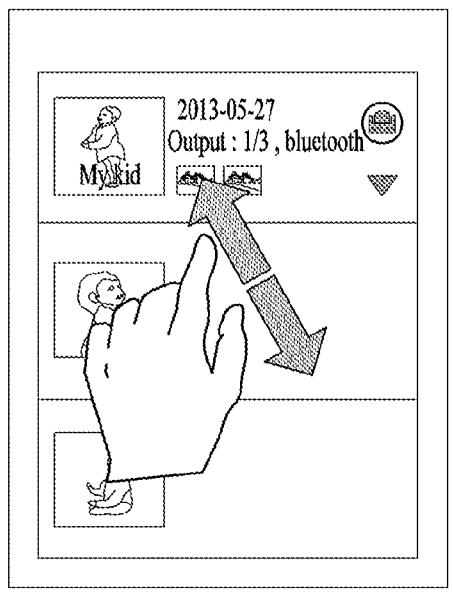
(a)
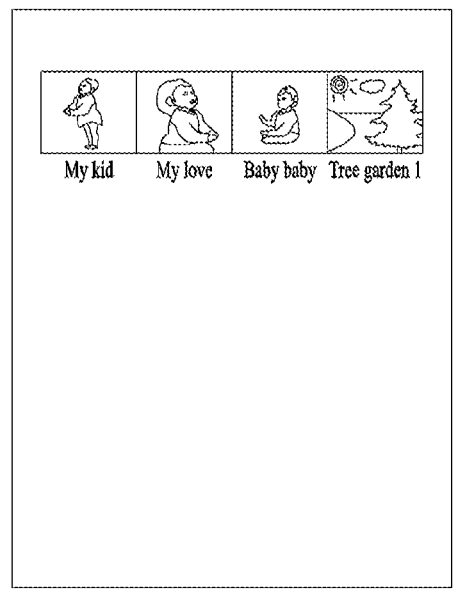
(b)
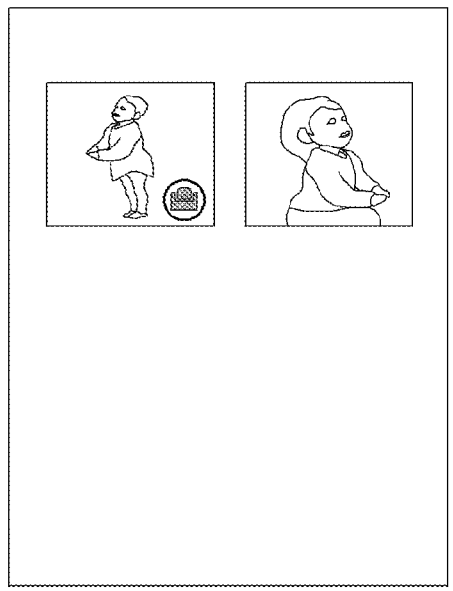
(c)
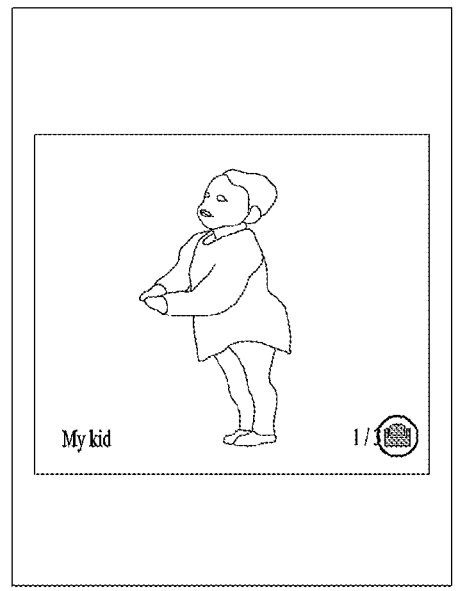
(d)

FIG. 10
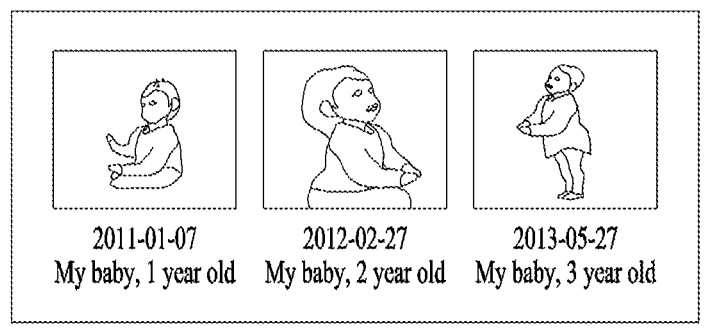
(a)
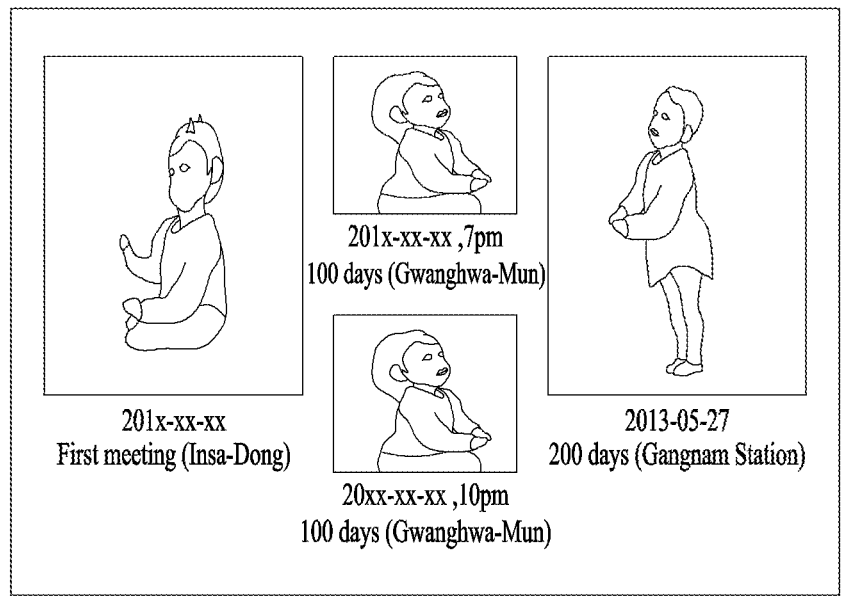
(b)

FIG. 17
(a)            (b)

FIG. 22
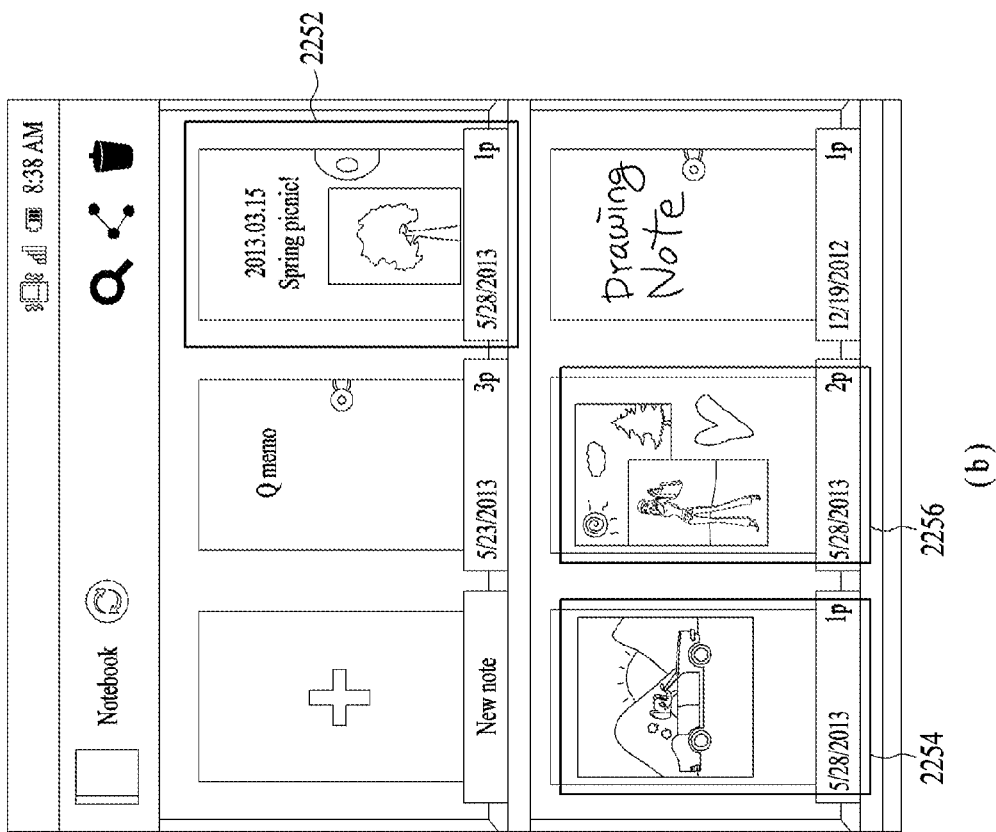
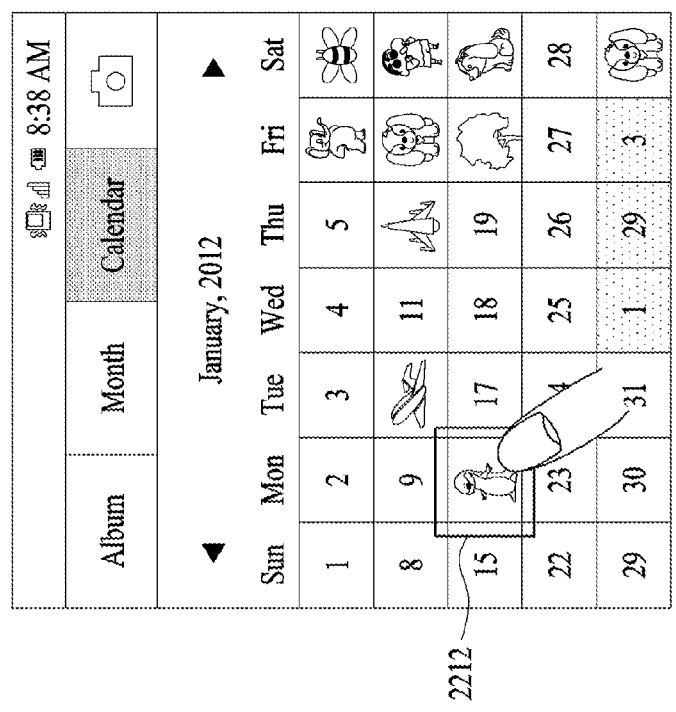

FIG. 23
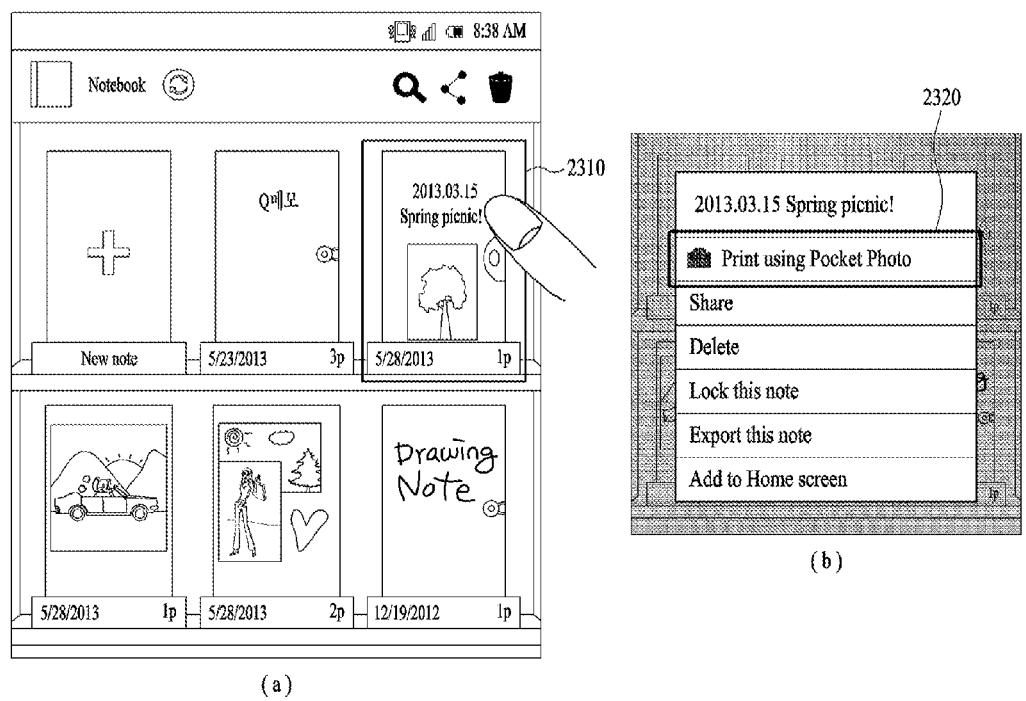
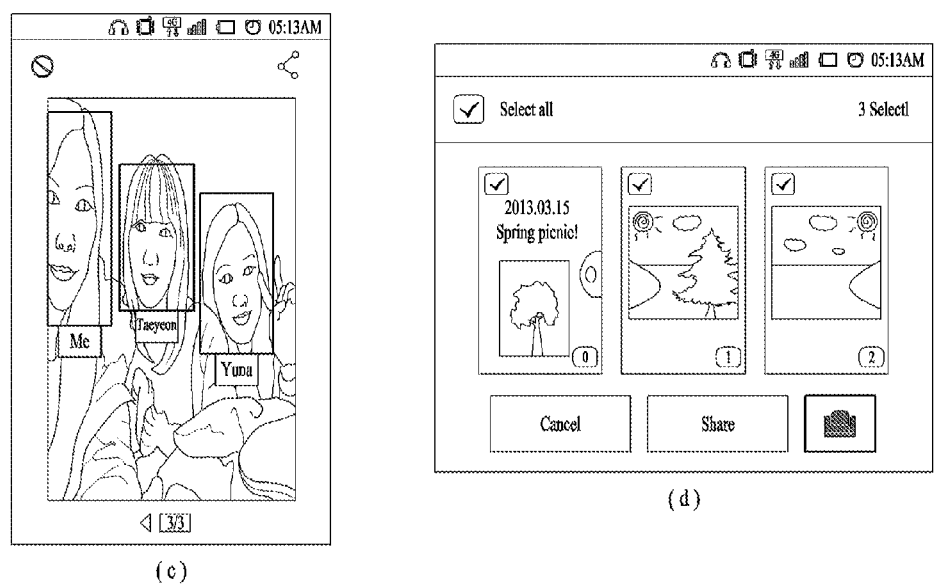

(a)          (b)

FIG. 31
3 persons selected
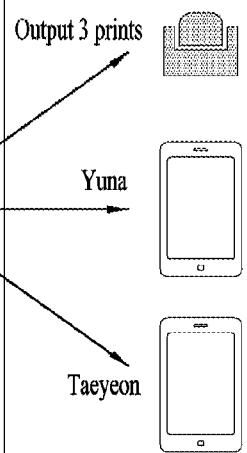
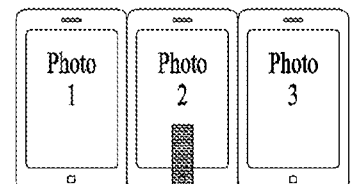
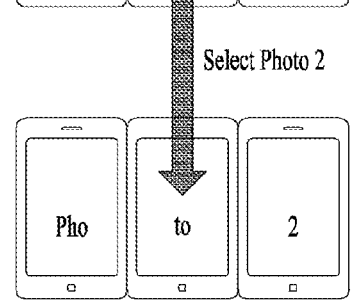
Output 3 prints
Yuna
Taeyeon
(a)
Select Photo 2
(b)

FIG. 32
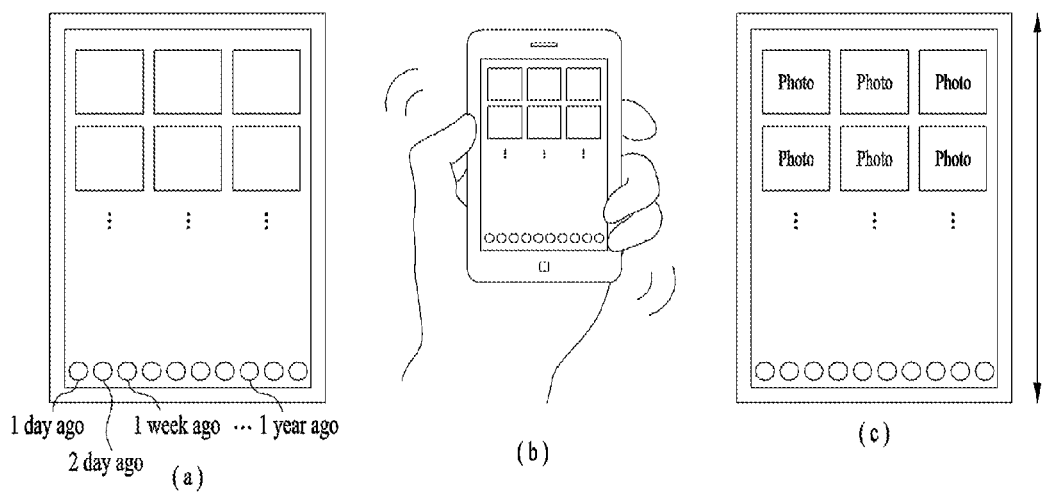
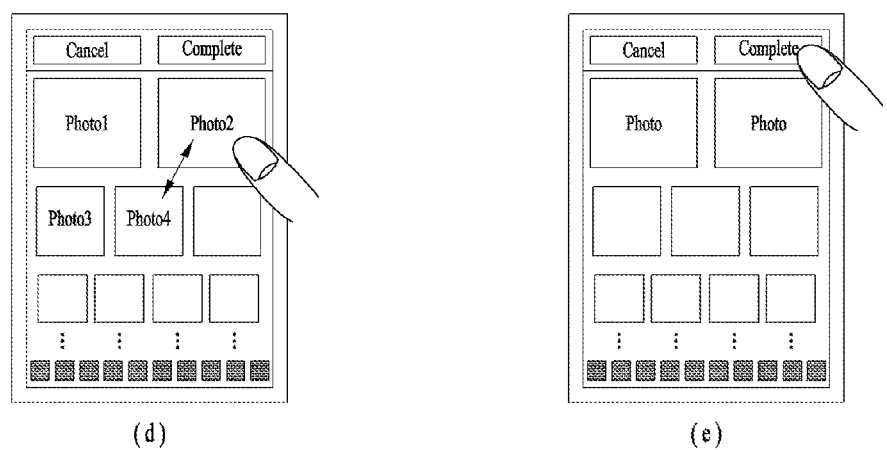

MOBILE TERMINAL AND CONTROLLING METHOD THEREOF FOR EDITING SECOND GALLERY IMAGE USING EDITING INFORMATION USED FOR PRINTING FIRST GALLERY IMAGE

CROSS-REFERENCE TO RELATED APPLICATIONS

Pursuant to 35 U.S.C. §119(a), this application claims the benefit of earlier filing date and right of priority to Korean Patent Application No. 10-2013-0113146 filed on Sep. 24, 2013, the contents of which are hereby incorporated by reference in its entirety.

BACKGROUND OF THE INVENTION

1. Field of the Invention

The present invention relates to a mobile communication system, mobile terminal and controlling method thereof. Although the present invention is suitable for a wide scope of applications, it is particularly suitable for performing a data communication.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Primary functions of a mobile terminal according to a related art include a message transmission and a voice call. Yet, owing to the developments of the information communication technology and the convergence technology, a mobile terminal turns into a complex digital device. For instance, as digital cameras are released into markets, they are rapidly replacing analog film cameras. As a digital camera is accompanied with an advanced camera sensor technology, a mobile terminal having a digital camera function absorbed therein jeopardizes or replaces the digital camera. Yet, the mobile terminal is inferior to the digital camera genuinely focused on camera functions. In particular, as the mobile terminal performs functions more diverse than those of the digital camera, the mobile terminal is more inconvenient than the digital camera in accessing a corresponding function, executing a corresponding function, checking data, printing an image, and the like.

Recently, as a mobile terminal is connected to a printable device by wire/wireless, an image in the mobile terminal can be outputted. However, after a gallery application has been activated in the mobile terminal, a desired image is selected to be printed out. Subsequently, if a print is requested by selecting a menu button in the mobile terminal, the printable device is selected and a wire/wireless communication protocol is activated. Then, the desired image is outputted through the selected printable device. Thus, the image printing process requires complicated steps and takes considerable time, thereby causing inconvenience to a user of the mobile terminal. Such inconvenience interrupts a re-execution or reuse of a corresponding function or application, thereby causing a problem of dissatisfaction with the mobile terminal and a problem of a decline in concern about a product purchase.

SUMMARY OF THE INVENTION

Accordingly, embodiments of the present invention are directed to a mobile communication system, mobile terminal and controlling method thereof that substantially obviate one or more problems due to limitations and disadvantages of the related art.

One object of the present invention is to provide a mobile communication system, mobile terminal and controlling method thereof, by which data communications are facilitated.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention includes a user interface unit configured to receive a user input and a user action, a controller configured to generate a first gallery including a first image saved in the mobile terminal included in a first application and generate a second gallery in response to the user input or the user action by linking the first application to a second application based on printing information on the image, the controller controlling an image printing by controlling a connection to a printable device, an output unit configured to output a second image of the generated second gallery, and a transmitting unit configured to transmit a signal including the outputted second image and a request for printing the second image to the connected printable device.

In another aspect of the present invention, as embodied and broadly described herein, a method of processing an image in a mobile terminal according to the present invention includes the steps of receiving a user input and a user action, generating a first gallery including a first image saved in the mobile terminal included in a first application, generating a second gallery in response to the user input or the user action by linking the first application including a first gallery to a second application based on printing information on the image, outputting a second image of the generated second gallery, generating a signal including the outputted second image and a request for printing the second image, and transmitting the generated signal to a connected printable device.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1A is a block diagram of a mobile terminal in accordance with the present disclosure;

FIG. 3 is a diagram to describe a method of printing an image in a mobile terminal;

FIG. 8 is a diagram to describe another example of a print history gallery;

FIG. 10 is a diagram to describe a time gallery;

FIG. 17 is a diagram to describe an intelligent gallery;

FIG. 22 is a diagram to describe an embodiment of configuring a notebook gallery;

FIG. 23 is a diagram to describe a method of printing an image in an album of the notebook gallery shown in FIG. 22;

FIG. 30 and FIG. 31 are diagrams to describe a method of transmitting an printable image; and FIG. 32 is a diagram to describe a method of sorting photos in a gallery automatically based on print history and photo utilized information.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
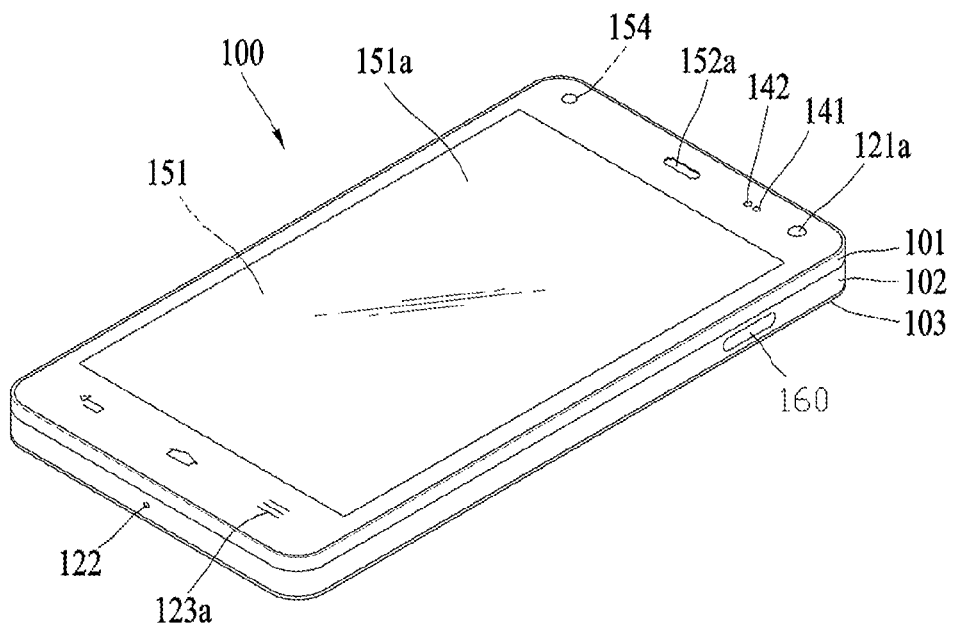
FIGS. 1B and 1C are conceptual views of one example of the mobile terminal, viewed from different directions.
Figure 1C:
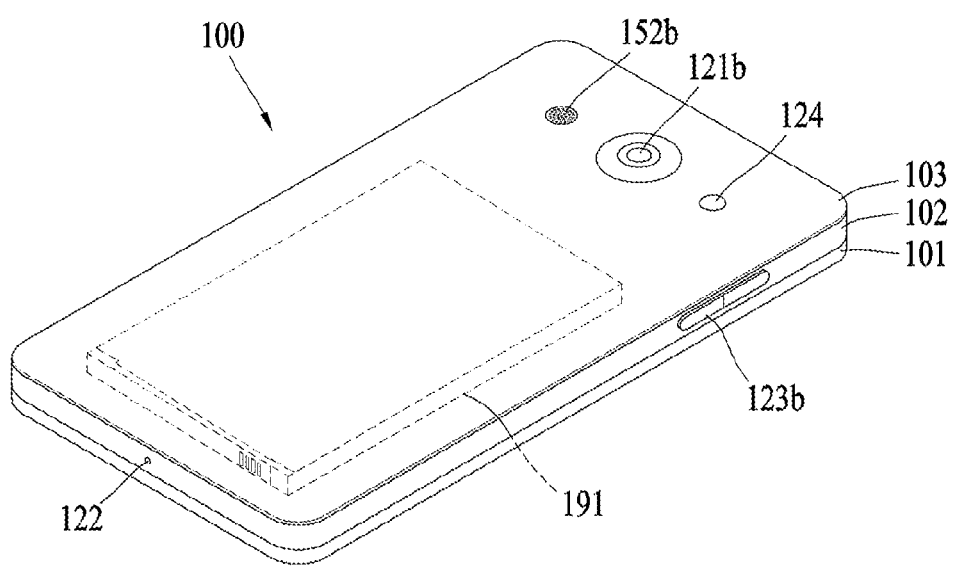

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A, and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2A:
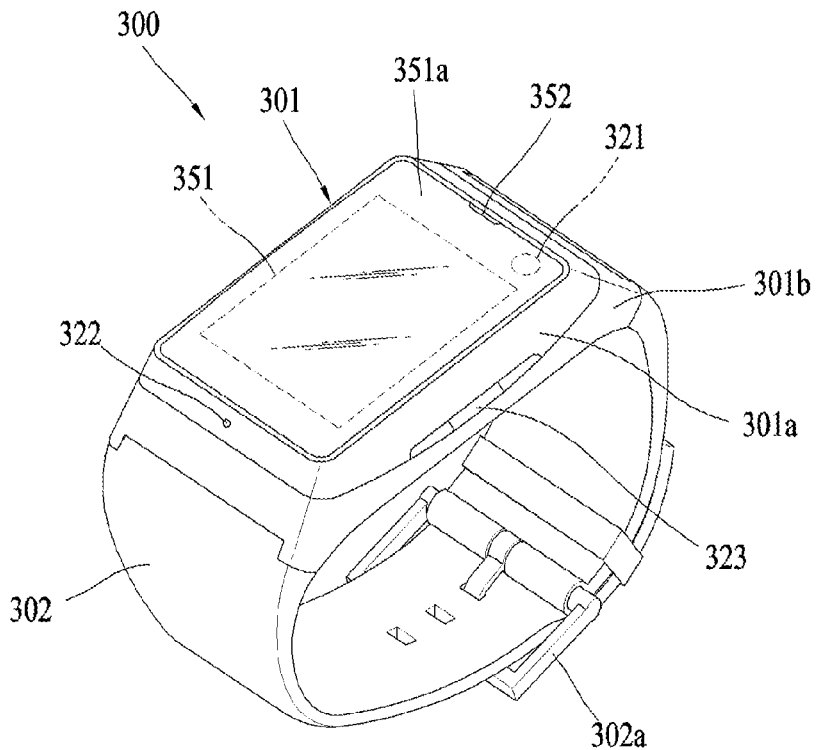
FIG. 2A is a conceptual view of a wearable mobile terminal according to another alternative embodiment of the present disclosure.

FIG. 2A is a perspective view illustrating one example of a watch-type mobile terminal 300 in accordance with another exemplary embodiment. As illustrated in FIG. 2A, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Figure 2B:
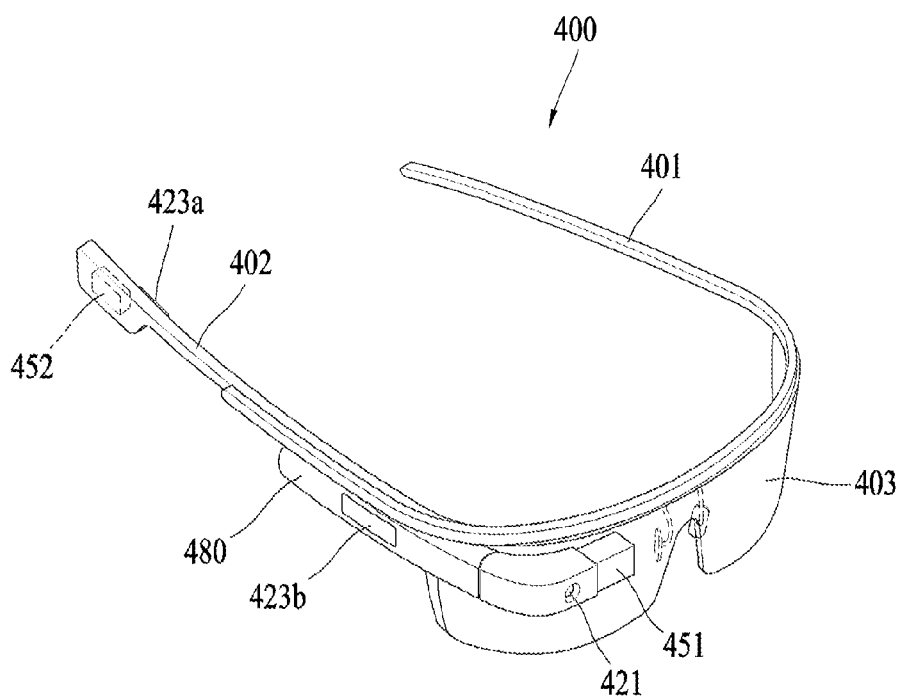
FIG. 2B is a conceptual view of a wearable mobile terminal according to another alternative embodiment of the present disclosure.

FIG. 2B is a perspective view illustrating one example of a glass-type mobile terminal 260 according to another exemplary embodiment. The glass-type mobile terminal 260 can be wearable on a head of a human body and provided with a frame (case, housing, etc.) therefor. The frame may be made of a flexible material to be easily worn. The frame of mobile terminal 260 is shown having a first frame 261 and a second frame 262, which can be made of the same or different materials. In general, mobile terminal 260 may be configured to include features that are the same or similar to that of mobile terminal 100 of FIGS. 1A-1C.

The frame may be supported on the head and defines a space for mounting various components. As illustrated, electronic components, such as a control module 290, an audio output module 282, and the like, may be mounted to the frame part. Also, a lens 263 for covering either or both of the left and right eyes may be detachably coupled to the frame part.

The control module 290 controls various electronic components disposed in the mobile terminal 260. The control module 290 may be understood as a component corresponding to the aforementioned controller 180. FIG. 1B illustrates that the control module 290 is installed in the frame part on one side of the head, but other locations are possible.

The display unit 281 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 260, the display unit 281 may be located to correspond to either or both of the left and right eyes. FIG. 2B illustrates that the display unit 281 is located on a portion corresponding to the right eye to output an image viewable by the user's right eye.

The display unit 281 may project an image into the user's eye using a prism. Also, the prism may be formed from optically transparent material such that the user can view both the projected image and a general visual field (a range that the user views through the eyes) in front of the user.

In such a manner, the image output through the display unit 281 may be viewed while overlapping with the general visual field. The mobile terminal 260 may provide an augmented reality (AR) by overlaying a virtual image on a realistic image or background using the display.

The camera 271 may be located adjacent to either or both of the left and right eyes to capture an image. Since the camera 271 is located adjacent to the eye, the camera 271 can acquire a scene that the user is currently viewing. The camera 271 may be positioned at most any location of the mobile terminal. In some embodiments, multiple cameras 271 may be utilized. Such multiple cameras 271 may be used to acquire a stereoscopic image.

The glass-type mobile terminal 260 may include user input units 273a and 273b, which can each be manipulated by the user to provide an input. The user input units 273a and 273b may employ techniques which permit input via a tactile input. Typical tactile inputs include a touch, push, or the like. The user input units 273a and 273b are shown operable in a pushing manner and a touching manner as they are located on the frame part and the control module 290, respectively.

If desired, mobile terminal 260 may include a microphone which processes input sound into electric audio data, and an audio output module 282 for outputting audio. The audio output module 282 may be configured to produce audio in a general audio output manner or an osteoconductive manner. When the audio output module 282 is implemented in the osteoconductive manner, the audio output module 282 may be closely adhered to the head when the user wears the mobile terminal 260 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, LTE, LTE-A), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, Node B, or evolved Node B), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a GPS module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The WPS refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless AP connected to the mobile terminal, and a database stored with wireless AP information.

The mobile terminal connected to the wireless AP may transmit location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 2A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

According to the following description, an image is edited and printed in a mobile terminal. A gallery is then configured based on the edited and printed image. Therefore, user's convenience in using the mobile terminal can be maximized.

FIG. 3 is a diagram to describe a method of printing an image in a mobile terminal.

In a mobile terminal, an image to be printed can be generally selected by selecting an item of a previously photographed image from a prescribed region of a screen while running a camera application or by activating a gallery application including previously photographed images.

In case of attempting to print an image in a mobile terminal, as mentioned in the above description, after an image has been selected, the selected image is requested to be printed through a menu button. In doing so, the mobile terminal lists up connectible printable devices among external printable devices. If at least one printable device is selected from a corresponding list, the image is printed through the selected at least one printable device. Thus, several steps and user actions are required for printing the image in the mobile terminal, thereby taking a prescribed time. Hence, a user of the mobile terminal is inconvenienced by feeling the image printing complicated and difficult.

In the present specification, an image can be printed through a mobile terminal with minimum user inputs, steps and time. And, a further intuitive user interface is provided in a printing process. Therefore, user's printing control convenience can be enhanced so that satisfaction with a product can be raised.

FIGS. 3 (a) to 3 (c) show a process for printing an image through a printable device in a printing application. In this case, the printable device includes a data communication available device by being connected to a mobile terminal through a wire/wireless communication protocol. And, the printable device is a common name of every device capable of printing an image received from a mobile terminal through a data communication. Moreover, as an example of the printable device, there are 'pocket photo', 'photo print', 'printer' and the like. Thus, the printable device is non-limited by its name and can include various kinds of image printing devices. Yet, in the present specification, for clarity and helping the understanding of the present invention, a pocket photo device is taken as an example of a printable device, by which the technical idea of the present invention may be non-limited. Meanwhile, the printing application is one of applications installed on the mobile terminal. And, the printing application is a common name of any application that can be provided to a user of the mobile terminal through a screen by including at least one image printable through the aforementioned printable device, i.e., the pocket photo device. Moreover, the printing application can include one of various applications including a gallery application, a notebook application, a quick memo application and the like without being limited by its name.

FIG. 3 (a) shows a case that a gallery application is activated in a mobile terminal. A printing process through the gallery application is described with reference to FIG. 3 (a) as follows.

Referring to FIG. 3 (a), if a gallery application is activated, a mobile terminal sorts images saved therein and then provides the sorted images through a screen of the mobile terminal.

The screen of the mobile terminal is mainly divided into 3 regions including first to third regions. The first region 311 is the region for providing basic information of the mobile terminal. In particular, the mobile terminal provides identification information on a service provider, to which a user of the mobile terminal has subscribed, information on a wire/wireless connection and a corresponding signal strength, a set function icon, a signal strength, battery information, visual information and the like to the first region 311 so that the user can identify the provided informations. Despite activations or executions of various applications in the mobile terminal, the first region 311 can be provided in a manner of being identifiable by the user of the mobile terminal. The second region 312 provides detailed information on the activated gallery application. To this end, the second region provides title information of a folder including images outputted to the third region 313, an icon for entering a camera mode, a share icon, and a trash can icon for deleting an image selected from the images outputted to the third region. The third region 313 provides images taken by a user, externally received images, externally downloaded images and the like by sorting then by prescribed references. Alternatively, images belonging to an image folder generated by a user may be outputted to the third region 313 only.

In case that a user attempts to print an image, the mobile terminal provides the user with printing convenience in a manner of providing a printing application to the screen in advance. In particular, the printing application may be provided onto the second region 312 or the third region 313. For instance, the printing application 314 is provided to the second region 312 of the mobile terminal if the gallery application is activated. After the user of the mobile terminal has selected at least one image from the third region 313, if the user selects the printing application 314, the selected at least one image is collectively outputted through the printable device, i.e., the pocket photo device. In doing so, a pairing between the mobile terminal and the pocket photo device or the like can be automatically performed when the gallery application is activated or the printing application 314 is selected. For another instance, if the user selects an image provided to the third region 313, printing applications 315 and 316 are provided in direct. As mentioned in the foregoing description, the selected image can be printed through the pocket photo device in response to a selection made by the user.

FIG. 3 (b) illustrates a printing method different from that shown in FIG. 3 (a). Referring to FIG. 3 (a) and FIG. 3 (b), after the mobile terminal has provided the image by activating the gallery application and the like [FIG. 3 (a)], if the user of the mobile terminal selects a prescribed image from the third region 313, the list shown in FIG. 3 (a) is switched to a different screen. In particular, the list form is switched to a screen of scrolling to change enlarged images in right/left direction in response to a selection made by the user. In doing so, if the user handles the image in right/left direction using his finger, an image next or previous to the current image is provided. Moreover, if the user performs a pinching-in action in top/bottom direction, a screen shown in FIG. 3 (b) is provided. In particular, a trash can application provided region for deleting a corresponding image is provided to a top end of the screen and a printing application 326 for printing the corresponding image is provided to a bottom end of the screen. In this case, a printing process in response to a selection of the printing application 326 is identical or similar to the former process described with reference to FIG. 3 (a). Hence, the corresponding substance is referred to and redundant description shall be omitted from the following description.

FIG. 3 (c) shows a printing process depending on a state of a mobile terminal. In this case, a state of the mobile terminal means whether an inclination of the mobile terminal is rotated. In general, a mobile terminal provides a screen that rotates in response to its inclination rotation. Hence, this case also relates to a method of providing printing applications 332 and 334 when the mobile terminal is rotated in such a situation as shown in FIG. 3 (a) or FIG. 3 (b). Referring to FIG. 3 (c), if the mobile terminal is rotated, each of the printing applications 332 and 334 can be provided to a prescribed location together with a photographing function button, an image button, a switching button between an image photographing and a video shooting, which are provided to a bottom end of the screen. Alternatively, the printing application 334 can be provided to a prescribed region (e.g., a right top end in FIG. 3 (c)) of an image currently provided to a region except the above-explained button providing region. As mentioned in the foregoing description, both of the printing applications 32 and 334 can be provided at the same time or the printing application 334 can be provided in response to an image selection made by the user. On the other hand, the printing application 332 and the printing application 334 may differ from each other in function. For instance, the printing application 332 may be used to print all images saved in the mobile terminal or all images (e.g., an image taken today, images in a same folder, etc.) sorted by specific sorting references) at a time. On the contrary, the printing application 334 may be used in case of attempting to print a corresponding image provided through the screen of the mobile terminal only.

Figure 4:
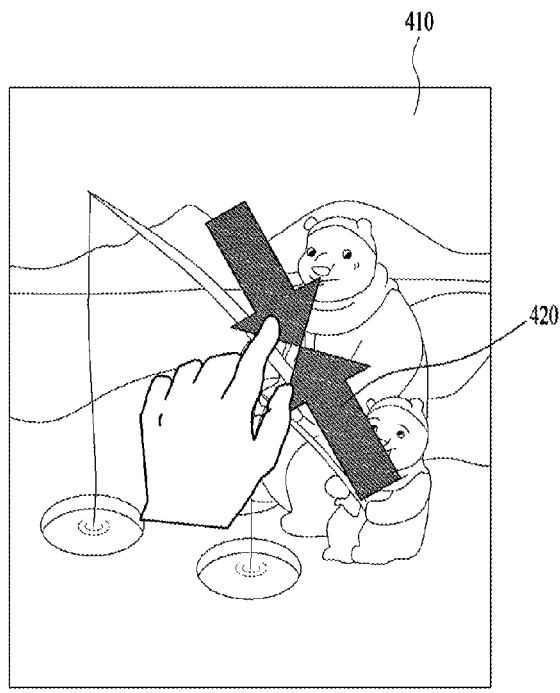
FIGS. 4 to 6 are diagrams to describe a method of editing an image in a mobile terminal.
Figure 5:
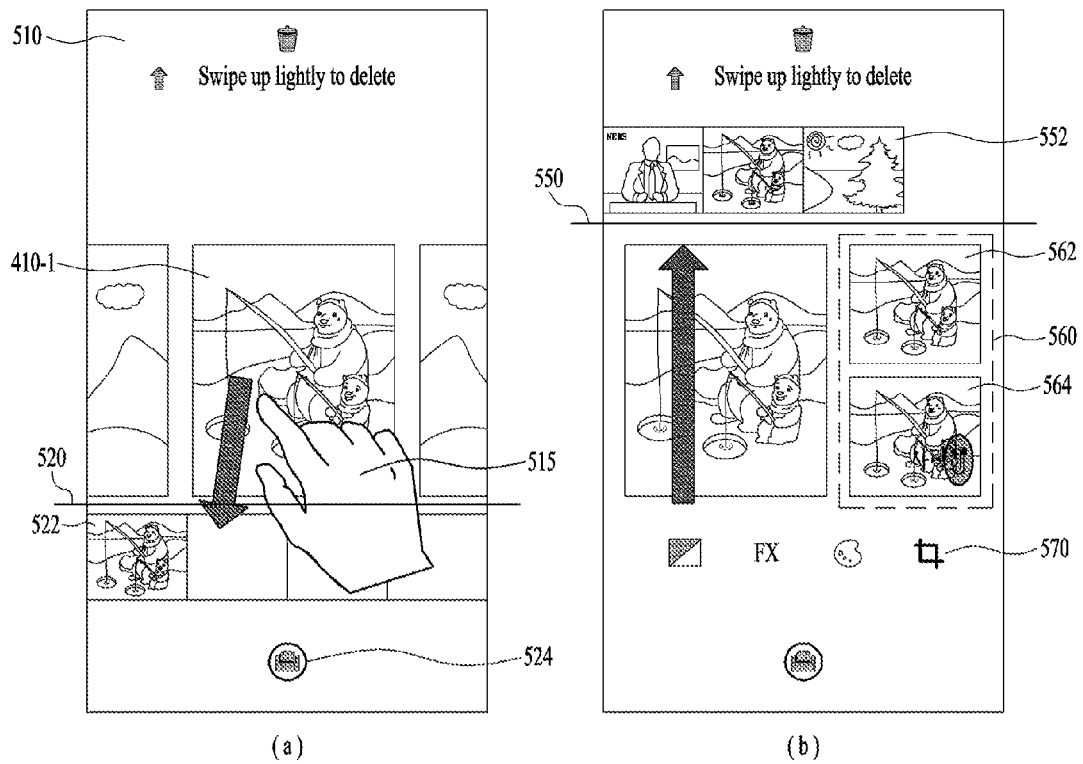
Figure 6:
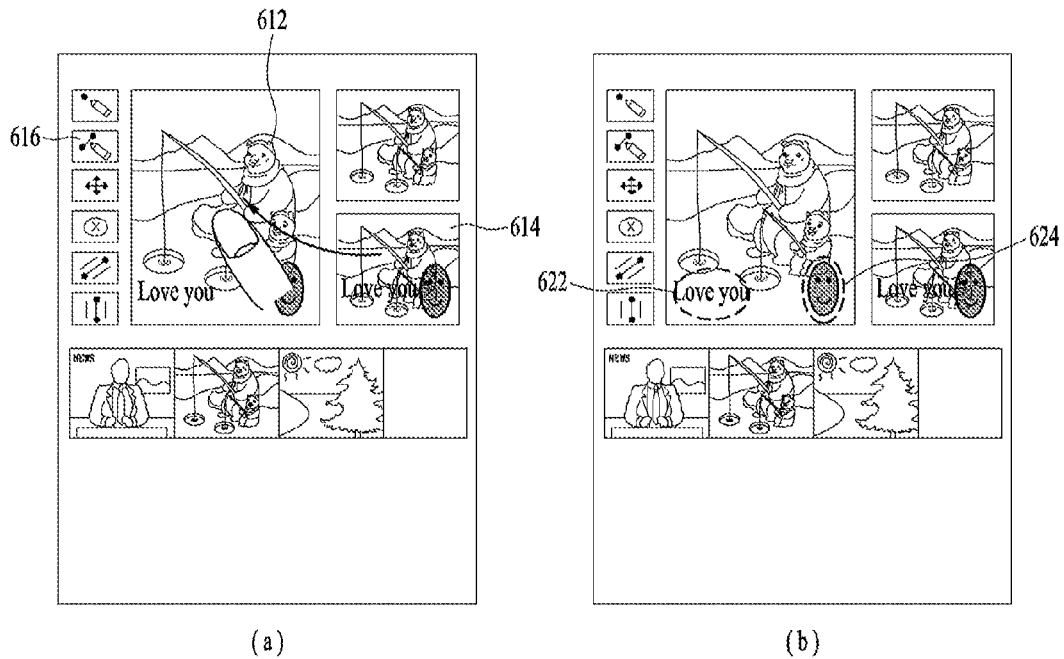

FIGS. 4 to 6 are diagrams to describe a method of editing an image in a mobile terminal. Basically, the image editing method shown in FIGS. 4 to 6 may be configured on the basis of an image printed through a printable device connected to the mobile terminal.

In the following description, a method of editing an image in a mobile terminal through a printable device using a printing history is explained with reference to FIGS. 4 to 6.

Particularly, according to the following description with reference to FIGS. 4 to 6, explained are a user interface (UI) for performing a pick-up, an editing, a printing and the line on a single screen by basically applying a filter or effect on the basis of data on an image editing processing, e.g., an effect applied to a printing, a user interface (UI) for displaying a history of an effect applied to a printing as a story line, and a process for applying a same effect to another image using editing data from a printed image. This image editing processing is provided to help a mobile terminal user to perform an editing of a different image using data related to a single image printing more easily than to perform an editing of the related art.

Generally, a screen for editing an image, a screen for selecting an image and a screen for printing an image operate separately in a mobile terminal. In doing so, if a plurality of images exist rather than a single image, it is considerably inconvenient to perform an editing in each of the above cases. Besides, after an editing of one image has been completed in a mobile terminal, in case of attempting to apply editing factors of the editing-completed image to another image equally or similarly, a mobile terminal of the related art requires such a repeated job as setting and applying the editing factors one by one again.

In order to solve the above-mentioned inconveniences and/or problems of the image editing process in the mobile terminal, the following processing is disclosed in the present specification.

First of all, a mobile terminal analyzes a user's editing pattern in association with such an editing factor as a filter, an effect and the like and then provides such an editing factor mainly used for a previous editing as a filter, an effect and the like as basic settings (e.g., defaults). Thus, if the mobile terminal provides the editing factors according to the user's use pattern as the basic settings, it is able to facilitate a process for editing a plurality of images. In particular, if the user requests an image editing, the mobile terminal provides the basic settings according to the user's editing pattern analysis as follows. For instance, in case that the user inserts a lomo as an artistic effect, a photo shop effect as an adjustment, and a date, text and the like for a drawing in an image, if the user mainly uses such font information as a 14-point font size of a clear gothic style, the mobile terminal provides it as the basic settings. In this case, if the user just selects an icon for the editing factor provided as the basic settings to an image to print out, the same editing effect can be provided. Regarding this, an editing factor according to a user's use pattern provided as a basic setting in the mobile terminal can be provided in a manner of analyzing an editing pattern of a corresponding user by such a time unit as a year, a month, a day and the like. Alternatively, a most recently applied editing factor can be provided as the above editing factor. Besides, factors desired by a user can be saved and provided in a manner of being set as the editing factors and designated as the basic settings. Alternatively, factors desired by a user can be implemented to be directly applied in response to a selection made by the user in a manner of querying whether to apply the basic settings through a popup window provided in case of an image editing request made by the user or in a manner of generating a basic setting icon or the like and then outputting the generated basic setting icon that overlays an editing target image semi-transparently.

In the following description, a method of providing an image editing, an image pick-up and an image printing as a single screen is explained.

First of all, as mentioned in the foregoing description, if a gallery application is activated, a mobile terminal of a related art requires several steps for a user to select, edit and print an image. For instance, if the gallery application of the mobile terminal is activated, the user selects an image and then selects an editing by pressing a menu button. Subsequently, if editing tools are provided, the user applies such a factor as an effect and the like through a desired editing tool. Thereafter, the user saves the editing factor applied image, selects the saved image, selects a printing by pressing a menu button, activates a communication protocol, selects a printable device, and then finally prints out the saved image. In case of attempting to print the image in the mobile terminal, the above-described process is repeated.

As mentioned in the foregoing description, prescribed steps are necessary until a single image is printed in a mobile terminal. And, screens are changed in doing so. Thus, inconveniences are caused. Therefore, it is necessary for an image to be printed in accordance with a user's event with a minimum work within a single screen by a minimized process.

In FIGS. 4 to 6, a mobile terminal can operate in an editing mode to facilitate an editing in the mobile terminal in accordance with a prescribed action of a user. FIG. 4 shows one example of a pinch-in input 420 as the prescribed action of the user. In particular, referring to FIG. 4, while an image 410 is provided through a screen of a mobile terminal screen, if a user applies a pinch-in action 420, the mobile terminal switches the current screen to a screen having a trash can and a print icon respectively provided to its top and bottom ends, as shown in FIG. 3 (b) or FIG. 5 (a). In doing so, a size of the image may be reduced smaller than a previous size.

If the user applies the pinch-in action 420 to the image 410 [FIG. 4], the mobile terminal can configure and provide the screen shown in FIG. 5 (a) and/or FIG. 5 (b).

In this case, FIG. 5 (a) shows the case in a printing mode and FIG. 5 (b) shows the case in an editing mode.

Referring to FIG. 5 (a), if a user applies the pinch-in action 420 to the image 410 provided to the mobile terminal [FIG. 4], a trash can icon 510 is provided to a top end of a screen and a printable list region 522 and a print icon 524 are provided to a bottom end of the screen. Meanwhile, a plurality of images including an image 410-1 are selectably provided in a manner of being arranged in the middle of the screen of the mobile terminal in a landscape direction.

In doing so, if the user selects an image and then shifts the selected image to a location below a reference line 520 by performing a drag & drop action 515, the corresponding image is added to a printable list region 522. And, the printable images added to the corresponding list are printed through the printable device in order of addition in response to a selection of a print icon 524. As mentioned in the foregoing description, if the user selects the print icon 524, the mobile terminal activates a communication protocol (e.g., Wi-Fi) without an additional user's action, selects a printable device, and is then able to print a corresponding image in response to a user's selection of the print icon 524. In doing so, in case that a plurality of printable devices are found, a user interface (UI) requiring a user's selection can be provided in a popup form or the like or information on a current state of the selected printable device can be provided. For instance, if the selected printable device is a pocket photo device, it is able to provide information related to a user intention for requesting a printing in a manner of providing various kinds of information including information indicating how may images can be outputted through the pocket photo device, information indicating whether a power of the pocket photo device is currently turned on or off, information indicating whether a printing paper needs to be supplemented, and the like. Meanwhile, as mentioned in the foregoing description, the printing list 522 may be related to a printing order. Hence, the user can change an order in printing images on the printing list 522 in a manner of selecting an image from the printing list 522 and then dragging & dropping the selected image on the printing list 522 randomly. On the other hand, if the user keeps selecting an image on the printing list 522 over prescribed duration or drags & drops an image in a direction opposite to that of the action 515, the corresponding image can be deleted from the printing list 522. Moreover, after an icon (not shown in the drawing) for viewing the printing list on a full screen has been provided nearby the print icon, if the provided icon is selected, a screen is reconfigured so that the image on the printing list 522 can be viewed again. Besides, if the icon is selected, as shown in FIG. 5 (b), an editing & printing mode can be entered. In this case, unlike FIG. 5 (b), the printing list 522 can be provided instead of an editing list 552 on a top end, whereby an editing and printing can be further facilitated.

If the example shown in FIG. 5 (a) is named a printing mode, the example shown in FIG. 5 (b) can be named an editing & printing mode.

The editing & printing mode is described in detail with reference to FIG. 5 (b) as follows.

First of all, as mentioned in the foregoing description, a current screen is switched to a screen shown in FIG. 5 (a) in response to the pinch-in action shown in FIG. 4. In doing so, if a user's action 515 is applied, a printing list 522 can be activated. On the other hand, if the user applies an action 555 of selecting an image and then crossing a top reference line 550, the mobile terminal provides an editing list 552 in accordance with the user's action 555 to a partial top region. Thus, if the editing list 552 is activated in response to the user's action 555, images edited and printed through an editing tool 570 in association with a corresponding image are provided to a prescribed region 560. In this case, if the user selects one of the printed images provided to the prescribed region 560, all editing factors applied to the selected printed image are intactly applied to the corresponding image. If so, the region 560 may disappear or may keep being maintained. Meanwhile, the editing tool 570 indicates what kinds of factors are applied as the tools for the editing factors related to the selected image are activated. Thus, as the editing factors are activated, the user can be aware what kind of editing factor is added to the corresponding image. In case of attempting to perform an additional editing or the like, the user can use the corresponding information appropriately. Meanwhile, the user can apply various editing factors applied to the editing list 552 complexly to a single image. For instance, if the user intends to apply both the editing factor applied to a first image 562 and the editing factor applied to a second image 564 to a desired image at a time, the user can apply the editing factors simultaneously by selecting the respective images 562 and 563.

The user can repeatedly provide the aforementioned editing factors for the image to another image on the editing list 552. In doing so, the mobile terminal provides an editing icon nearby the print icon 524 in a manner similar to that of the print icon (not shown in the drawing). When the user selects a different image from the editing list 552 and then selects the editing icon, if a color is changed into blue from red, an editing factor applied to a previous image is equally or similarly applied to the corresponding image. Moreover, in case of intending to edit a plurality of images on the editing list 552 more conveniently in the same manner, if an image on the editing list 552 is selected while the editing icon is selected, the editing factor can be equally applied to all the images on the selected editing list 552.

FIG. 6 (a) and FIG. 6 (b) may be the detailed diagrams of FIG. 5 (b) for example.

Like FIG. 5 (b), FIG. 6 (a) shows a case that an effect of a previous printing list image 614 is exactly applied to an editing target image 612 in a manner of dragging & dropping the previous printing list 614 to the editing target image 612. In this case, referring to FIG. 6 (a), an editing tool related to an editing factor and an editing tool 616 for an additional editing can be provided to a screen.

Meanwhile, FIG. 6 (b) shows a case that an effect applied for an additional editing or a modification editing is activated and provided. In this case, the activated effect is selectable like an icon 622/624. If a user selects the icon 622/624, an editing tool is activated to select the effect applied to the corresponding icon 622/624. Hence, it is able to minimize inconvenience for a user to search each editing tool in order to modify the corresponding icon.

Meanwhile, FIG. 5 (*b*) and FIG. 6 are similarly applicable to a case of printing an image uploaded to a social network service activated in a mobile terminal. In doing so, a user can edit a tagging, a sentence and the like through the mobile terminal variously.

Figure 7:
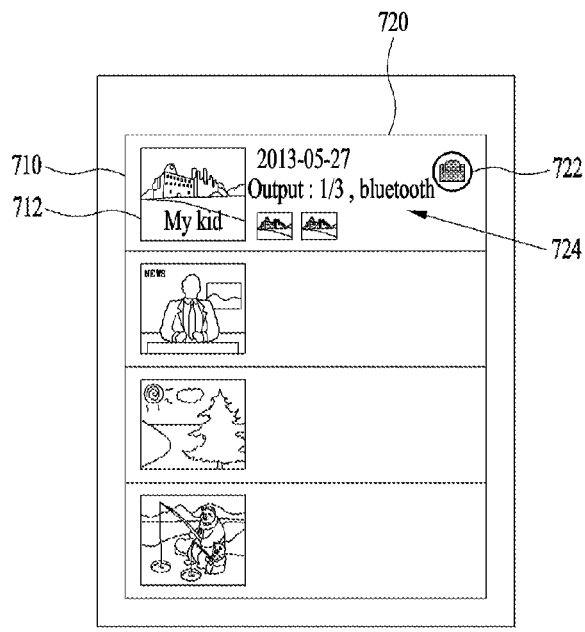
FIG. 7 is a diagram to describe one example of a print history gallery.

FIG. 7 is a diagram to describe one example of a print history gallery.

In a mobile terminal, a user can view a multitude of images through a gallery application. In doing so, the user is unable to know wither each image is printed. In particular, the user is unable to know which image has been already printed or which image has not been printed yet. In other words, there is no method of sorting images for printing on a mobile terminal. Generally, character images are most frequently printed and landscapes or objects are second most frequently printed. Yet, such an abstract factor is not enough to indicate a print history (e.g., whether a prescribed image has been actually printed, etc.).

If a gallery application is activated in a mobile terminal, images photographed through an image sensor of the corresponding mobile terminal and images received from an external device are generally provided in a manner of being sorted irrespective of a printing. In doing so, specific images can be provided as a folder. In this case, such a folder can be named a gallery.

In order to get information on a photographed image in a gallery, a user of a mobile terminal can obtain a printing history of the corresponding image by accessing detailed information using a menu button.

In the present specification, a printing history gallery can be configured in various ways. For instance, a printing history gallery can be configured as follows. In particular, a gallery can be implemented in a manner of changing information on an image by several steps in response to a user action, i.e., an event.

Thus, steps of a gallery can be changed in response to an event based not on a menu button but on a user's action. For instance, if a user applies a pinch-in or -out action with 2 fingers, a voice input, a volume key turn-up or -down action, it is able to start to perform the gallery step change.

A method of configuring image information step by step in accordance with the step change can be implemented as follows.

According to a first step, a mobile terminal provides printing history information on an image previously printed once at least only and editing history information on the image. According to a second step, the printed images are sorted and provided in a smallest size. According to a third step, a size of a printed image is set different from those of others and then provided by being overlapped with a title of the printed image. In doing so, the title may be removed in response to a user's selection if necessary. According to a 4$^{th}$ step, by differentiating a size of a printed image from those of others and providing a print icon and/or an editing icon, it is able to indicate that a printing or an editing has been performed. According to a 5$^{th}$ step, a printed image is separately provided and an editing icon, a print icon and the like can be provided in a manner of overlapping the corresponding image.

As mentioned in the foregoing description, a mobile terminal can implement a gallery of a multitude of images on a gallery. Hence, a user can obtain a printing history of the images and print the images, easily and quickly.

FIG. 7 may show one example of a gallery configuration if a printed image is included in a multitude of images.

Referring to FIG. 7, 4 images exist on a gallery. A first image is provided to a first region 710 and a title 712 is provided in a manner of overlapping the first image. And, editing/printing history information is provided to a second region 720. In this case, the editing/printing history information may include information on a printed time, information on the number of printings, information for a paring between a printable device and a mobile terminal, editing information and the like. Meanwhile, in case of FIG. 7, if it is difficult for the second region 720 to output the whole editing/printing history at a time, a gallery can be configured in a manner that the whole editing/printing history can be unfolded on the corresponding screen through an open view icon 724 under a print icon 722 or an editing icon (not shown in the drawing) to be recognizable at a time.

If the first image shown in FIG. 7 is selected, detailed information including image photographing information, a storage path and the like can be further provided. Moreover, if the second region 720 is selected, the detailed information on the editing/printing history can be provided in the same manner of the selection of the aforementioned open view icon 724.

FIG. 8 is a diagram to describe another example of a print history gallery.

Referring to FIG. 8, like FIG. 7, if a user applies a pinch-out action to a screen to which a gallery is currently provided [FIG. 8 (*a*)], the current screen can be switched to one of the screens shown in FIGS. 8 (*b*) to 8 (*d*).

Referring to FIG. 8 (*b*), it can be observed that printed history images are arranged not in a portrait direction of FIG. 8 (*a*) but in a landscape direction. In doing so, corresponding image title information can be provided onto each of the images.

Referring to FIG. 8 (*c*), a multitude of images are provided in a manner that such an icon as a print icon, an editing icon and the like overlaps an image having been printed or edited only. In doing so, if a user selects the print icon, the editing icon or the like, the current screen can be switched to one of the screens shown in FIGS. 4 to 6.

Referring to FIG. 8 (*d*), printed image(s) is provided to the screen in a manner of being enlarged. Title information can be provided to a first region. And, information on the number of printings and the like can be provided to a second region together with an editing icon.

Thus, in configuring the printing history information, the printing history sorting can be performed based on such information as the number of printings, a printing date (or time), a printed location, a tagging added for a printing, the number of photographed persons, a photographing time, a photographing location, a photographing audio tagging, a face recognition, an object recognition, a use of a front/rear camera and the like.

Through the above description, the mobile terminal can configure a story gallery based on a printing history and/or an editing history. Namely, the images printed through the mobile terminal by a user generally include the images desired to be saved or shown. Even if there is no separate selection made by the user, an automatic story board is created and saved in a manner of sorting the images having the printing history based on the above-mentioned printing history information. This story gallery can be edited in various ways in response to a selection made by the user in the future.

In the following description, various galleries configurable on the basis of a printing history, an editing history and the like are explained. For clarity, to help the understanding of the present invention, the present specification shows one example that an individual gallery is configured. Yet, a plurality of galleries can be combined to configure various galleries.

Figure 9:
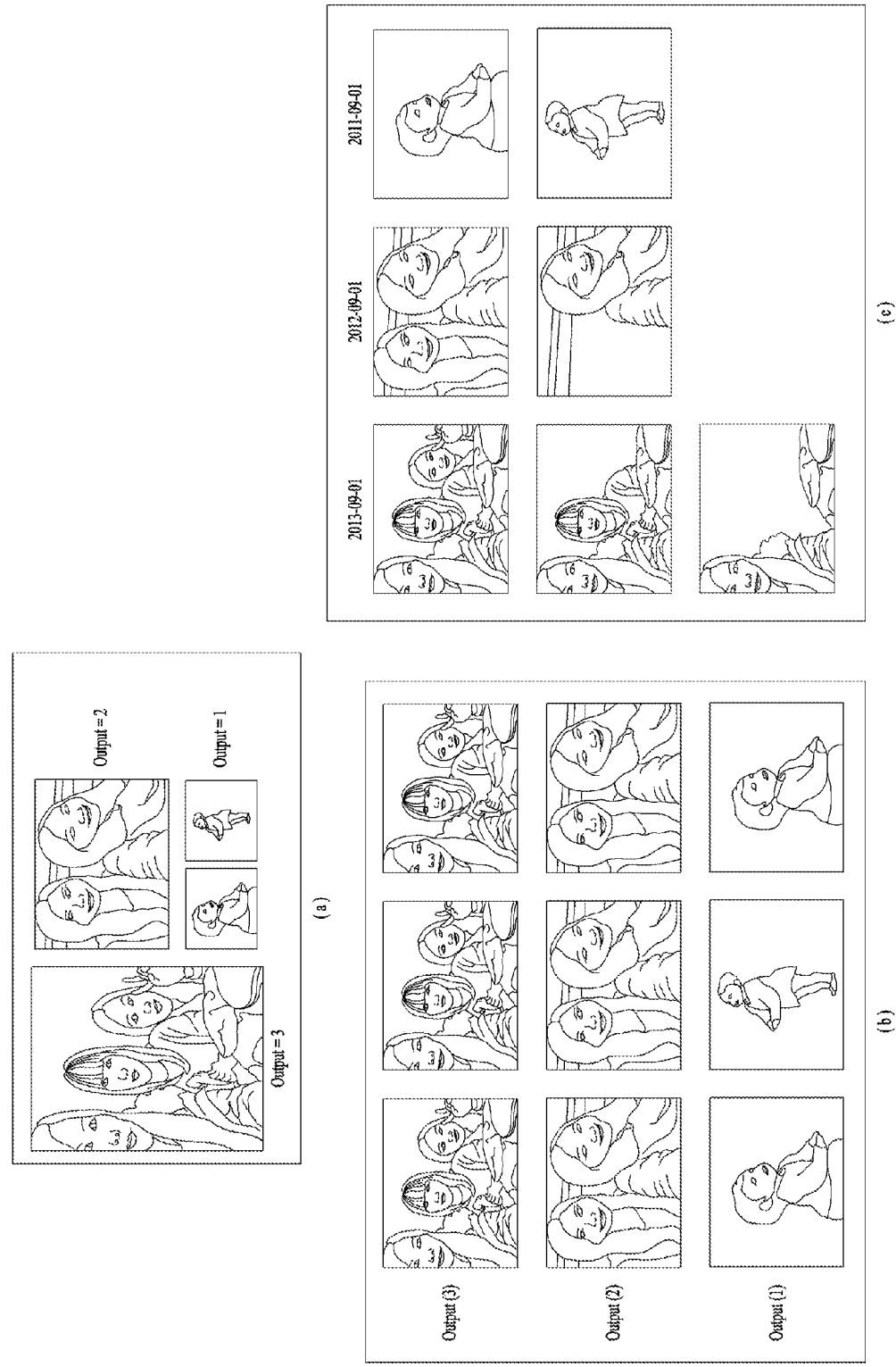
FIG. 9 is a diagram to describe a viewable gallery.

FIG. 9 is a diagram to describe a viewable gallery.

Referring to FIG. 9 (a), depending on the number of characters included in a printed image, in case of an image including a considerable number of characters, each of the characters can be identified if the image of the same size is enlarged. In particular, if an image includes a considerable number of characters, the image is generally enlarged to be viewable. Hence, an image including a considerable number of characters is provided in a manner of being enlarged larger than an original image. If an image includes a smaller number of characters, the image is provided in a size equal to or relatively smaller than an original image.

Soto speak, the viewable gallery shown in FIG. 9 (a) provides an image of which size is modified in proportion to the number of persons included in the corresponding image.

Thus, FIG. 9 (a) shows one example that the number of persons included in an image is taken as a reference. On the other hand, FIG. 9 (b) shows one example of a viewable gallery implemented on the basis of the number of printings. For instance, when the numbers of printings are 3, 2 and 1, respectively, as shown in FIG. 9 (b), if the number of printings is big, it is determined that a level of interest in a corresponding image is high. Hence, the corresponding image is provided in a manner of being enlarged. Otherwise, the corresponding image may be provided in a size equal to or smaller than that of an original image.

FIG. 9 (a) shows one example that the viewable gallery is configured based on the number of persons, whereas FIG. 9 (b) shows one example that the viewable gallery is configured based on the number of printings. On the other hand, FIG. 9 (c) shows on example that a viewable gallery is configured based on a printing time irrespective of the number of persons or printings. In particular, referring to FIG. 9 (c), it is highly probable that a user may be more interested in a recently printed image rather than an image printed long time ago despite having the big number of persons or printings. Hence, the printed images are sorted by a printing time unit with reference to a current hour based on a printing time of each image, whereby the image printed recently and the image printed long time ago can be provided in a larger size and a smaller size, respectively. Moreover, if a plurality of images are printed in a time of a prescribed unit, the number of persons, the number of printings and the like can be referred to.

Besides, by combining the number of persons mentioned in the description with reference to FIG. 9 (a) with the number of printings mentioned in the description with reference to FIG. 9 (b), an image can be provided in a manner that a size of the corresponding image is modified [not shown in the drawing]. Moreover, in FIGS. 9 (a) to 9 (c), if there is an image related to an image provided according to the above descriptions, i.e., an image including at least one same character, it can be arranged below or above the corresponding image to facilitate identification. And, such an image may include not only a printed image but also an image that is not printed yet. Through this, a user obtains the image that is not printed yet, whereby a corresponding printing can be facilitated. Thus, by providing a printing icon, an editing icon and the like in a simple manner, it is able to facilitate a printing of the corresponding image, an editing of the corresponding image and the like.

FIG. 10 is a diagram to describe a time gallery.

In this case, the time gallery includes one example of a gallery configured in order of time with reference to at least one person included in an image.

As mentioned in the foregoing description, a mobile terminal can provide various kinds of galleries configured based on a printing history.

In this case, if a printable image currently provided through a mobile terminal screen includes at least one character for example, the at least one character is selected from the printable image. The mobile terminal searches printing history images and then extracts the images including the selected character. Subsequently, the mobile terminal configures a gallery by sorting the extracted images in order of time based on time information or title information. The configured gallery becomes the time gallery shown in FIG. 10 (a) or FIG. 10 (b). In this case, the time information can be based on photographed time information or saved time information for example. When a prescribed image is downloaded, if photographed time information is included in the downloaded image, the corresponding image is sorted based on the photographed time information. Otherwise, the corresponding image can be sorted based on a downloaded time. On the other hand, when images are sorted based on time information, although sorted lists are difference from each other, if there is information (e.g., a title, etc.) inputted by a user for an image, it is able to configure a time gallery by sorting the printable images based on the inputted information with priority.

Referring to FIG. 10 (a), a time gallery is configured to represent a process (e.g., a year old, 2 years old, 3 years old, etc.) for a child to grow from printed images among images in a gallery of a mobile terminal.

Meanwhile, FIG. 10 (b) shows that a time gallery is configured by arranging photos taken between lovers in order of time (e.g., 100 days, 200 days, 300 days, etc.) in a similar manner. Yet, although a plurality of printable images are represented by the corresponding time information, FIG. 10 (b) shows that the time gallery is configured to facilitate user's recognition. Referring to FIG. 10 (b), when a plurality of second image items exist, if a user selects a region through which the corresponding second images are outputted, the images are reconfigured on the corresponding dates in order of time to form a time gallery.

By configuring the time gallery shown in FIG. 10, a subject change history can be easily viewed based on a printed time or a photographed time.

Figure 11:
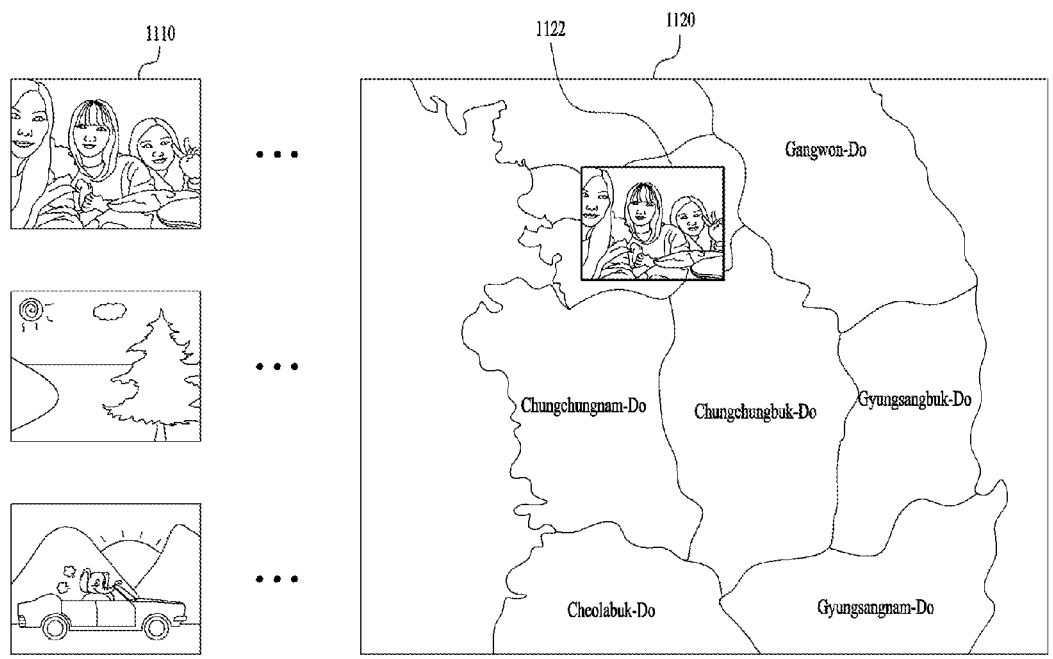
FIGS. 11 to 16 are diagrams to describe a geo gallery.

FIGS. 11 to 16 are diagrams to describe a geo gallery. In particular, a geo gallery shown in FIG. 11 is one example of implementing a gallery by mapping an image to a map for the facilitation of emotional and intuitive recognition of corresponding image(s).

FIG. 11 shows a control configuration screen for a user to map images, which are taken in friend meeting, family trip and the like, onto a map.

Referring to FIG. 11, if a user selects an image or images 1110 provided to a left side and then takes an action (e.g., a long press, etc.), a map application 1120 is activated or executed on a right side. If the user drags & drops the selected image 1110 to a specific location on a map of the activated map application, a geo gallery 1122 is generated.

Although the image and the map application are shown in the left side and the right side in FIG. 11, respectively, such a composition can be modified into various forms including a top-to-bottom composition and the like in consideration of features of a mobile terminal.

According to the description with reference to FIG. 11, after a map application has been activated in response to a user's action applied to an image, a geo gallery is generated.

Alternatively, while a map application is active, a geo gallery can be implemented in a manner reverse to that of the former description.

As mentioned in the above description, a geo gallery can be displayed on a map through an action directly taken by a user. Alternatively, a geo gallery can be automatically generated based on data such as a title of an image, a text related to the title, an audio related to the title and the like. Meanwhile, if there is a related image or video, which is not printed, despite being based on a printed image, a geo gallery can lead the corresponding image or video to be printed by displaying it.

Figure 12:
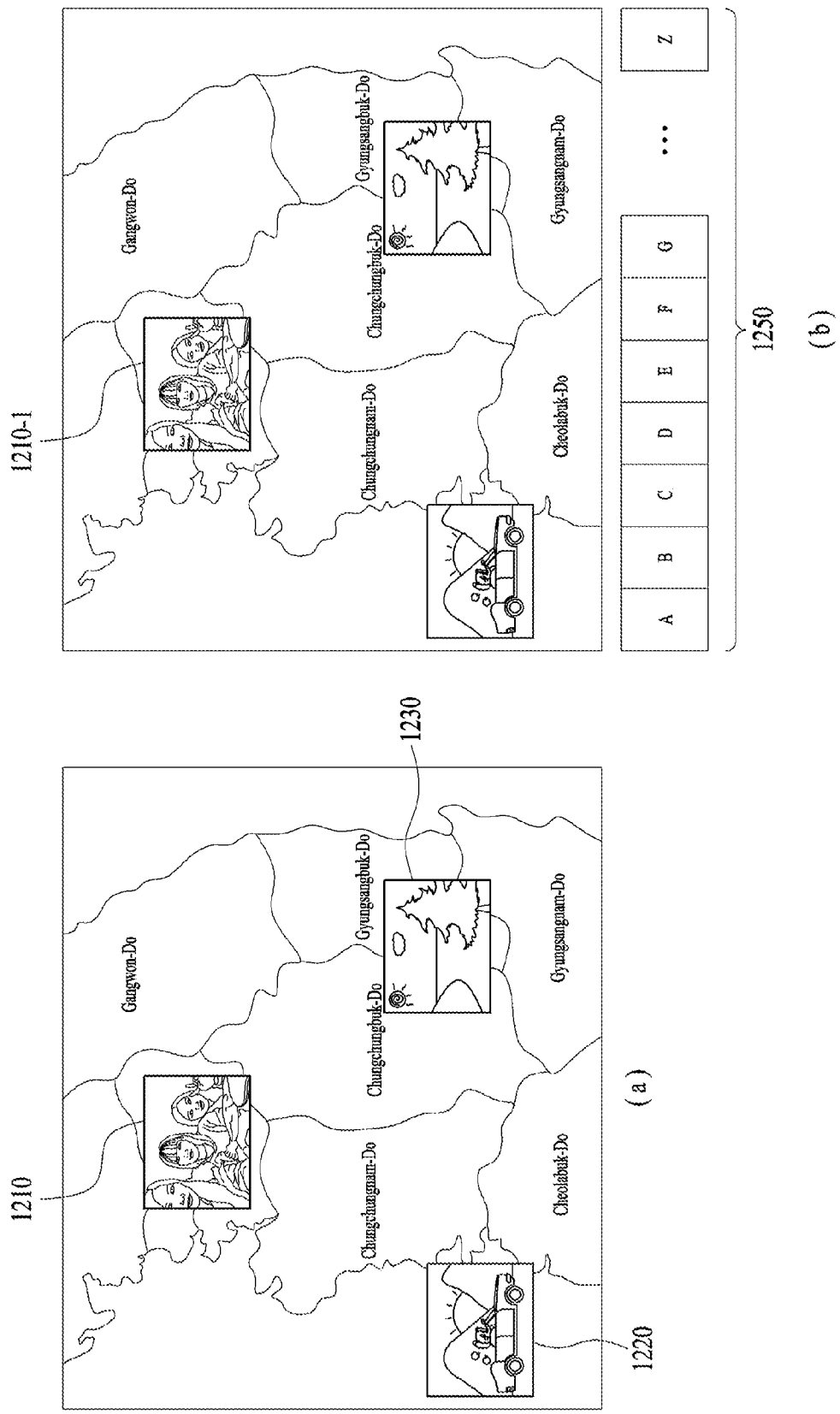

FIG. 12 shows one embodiment of a geo gallery implemented by mapping each image to a corresponding place.

FIG. 12 (a) shows one example of a geo gallery implemented in a manner that a plurality of images 1210, 1220 and 1230 are mapped onto a map. In this case, each of the images corresponds to a concept of a representative image for example and may include a best shot explained later in the following description. Meanwhile, the representative image is the image representing a plurality of images and may further include a plurality of other images.

Referring to FIG. 12 (b), if an image 1210-1 is selected from the geo gallery shown in FIG. 12 (a), a different image 1250 including the corresponding image 1210-1 is displayed on a bottom of the screen, i.e., a bottom of the map. On the other hand, although FIG. 12 (b) shows one example that the image 1250 is displayed on the bottom of the screen, the image 1250 may be provided nearby the selected image 1210-1 as a layered structure. Moreover, as mentioned in the foregoing description, if a user takes an action of pressing a specific image long or the like, a screen can be configured so that the specific image can be deleted or printed in direct.

Figure 13:
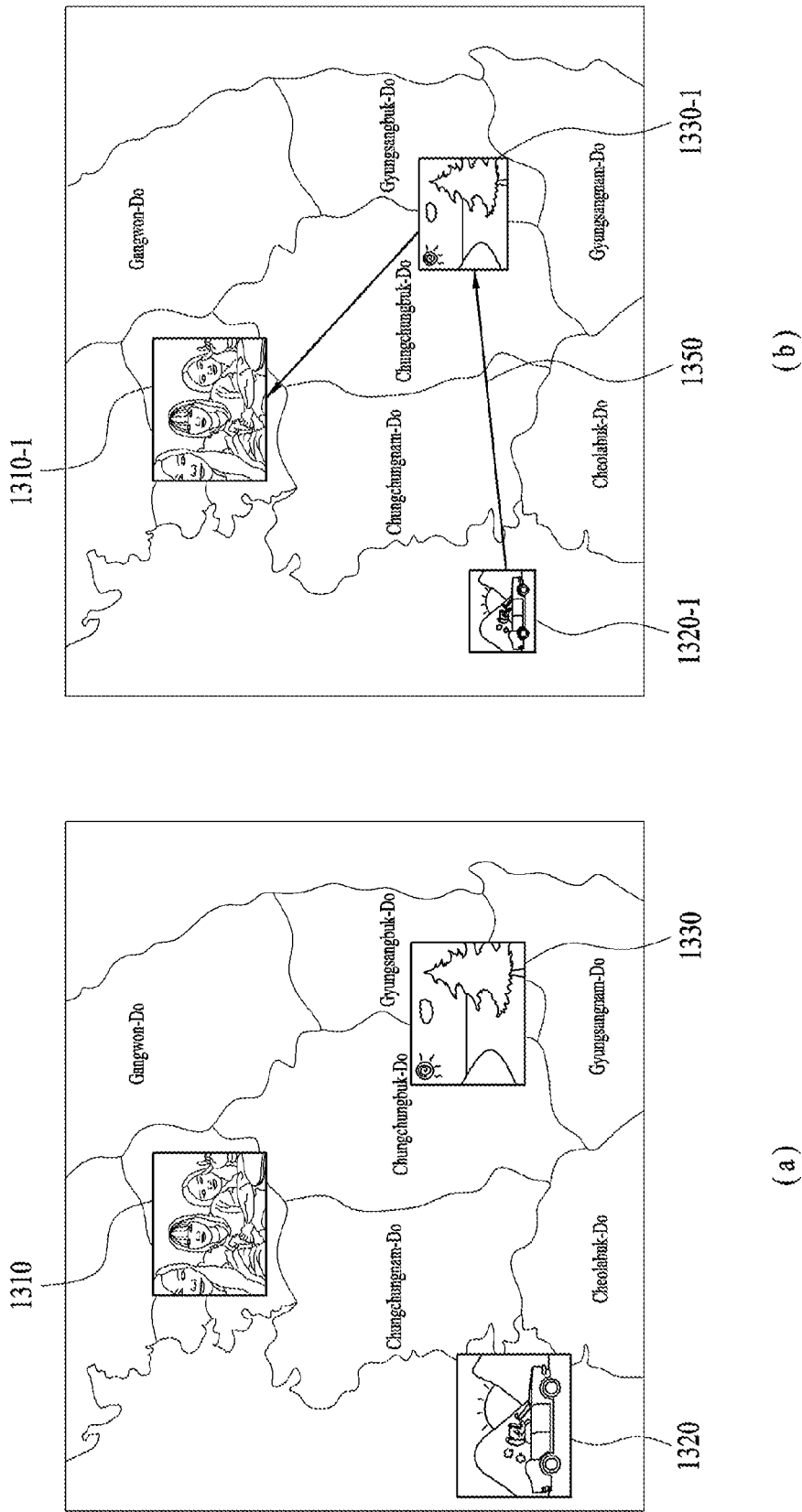

FIG. 13 is a diagram to describe another embodiment of a geo gallery implemented. FIG. 13 (a) shows a geo gallery implemented by the same method shown in FIG. 11.

Referring to FIG. 13 (a), a plurality of images 1310, 1320 and 1330 in a geo gallery may be equal to each other in size. A user of a mobile terminal can recognize trip places, to which the user has been, and images related to the trip places at a place through the geo gallery shown in FIG. 13 (a).

Yet, although time information and the like can be displayed on a corresponding image in FIG. 13 (a), it may not be intuitively recognizable.

Hence, referring to FIG. 13 (b), a plurality of images 1310-1, 1320-1 and 1330-1 are differentiated from each other in size in order of time and such an indicator 1350 as an arrow and the like is provided between the respective images, whereby a recent trip place and a previous trip place can be intuitively discriminated from each other. Moreover, an image of the recent trip place is configured in a largest size and an image of the previous trip place can be reduced in size.

Figure 14:
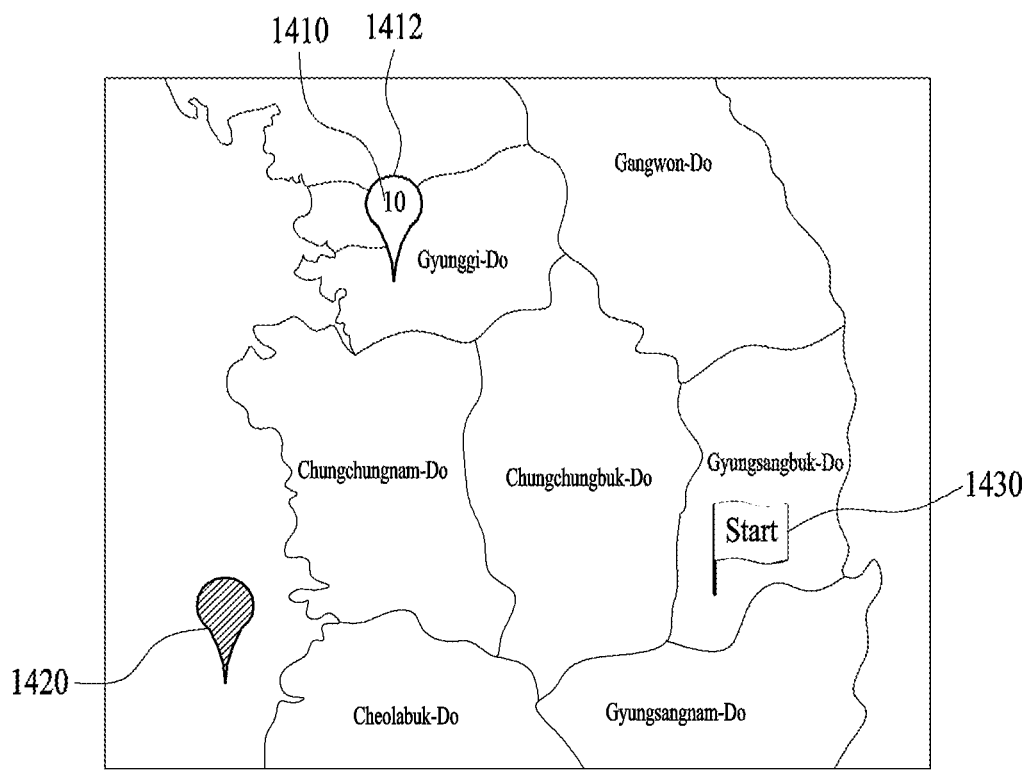

FIG. 14 shows a further embodiment of a geo gallery.

FIG. 14 shows a method of displaying indicators 1410, 1420 and 1430 at corresponding locations instead of representative images. When a wide area is displayed due to a small reduced scale of a map and a number of images are located in a single area, if representative images are outputted only, it may be difficult to intuitively recognize whether more images exist. Hence, the indicators are displayed.

Referring to FIG. 14, it is able to represent how many images are included in a corresponding one of the indicators 1410, 1420 and 1430 using a numeral 1412 inserted in the corresponding indicator. Moreover, the image included in the corresponding indicator and the information indicating whether it is a recent trip place can be intuitively recognizable in a mobile terminal through a color of the corresponding indicator, a size of the corresponding indicator and the like.

Moreover, referring to FIG. 14, it is able to display a geo gallery by a trip place unit. For instance, if a user visits several trip places for a week together with user's family, if geo galleries are separately generated for the visited trip places, respectively, it is difficult for the user to obtain the trip route (e.g., a visited place, a time of a visit, etc.). And, the user's sentimentality may decrease when the user recollects the previous trips. Using the indicators including an origination indicator 1430, a first trip destination indicator, a second trip destination indicator . . . and a final trip destination indicator, it is able to display information indicating when the corresponding trip was made through a prescribed route, information indicating where the images are frequently taken and the like together with an arrow indicator and the like. Therefore, the geo gallery becomes further intuitive and user's satisfaction with the geo gallery can be enhanced.

Figure 15:
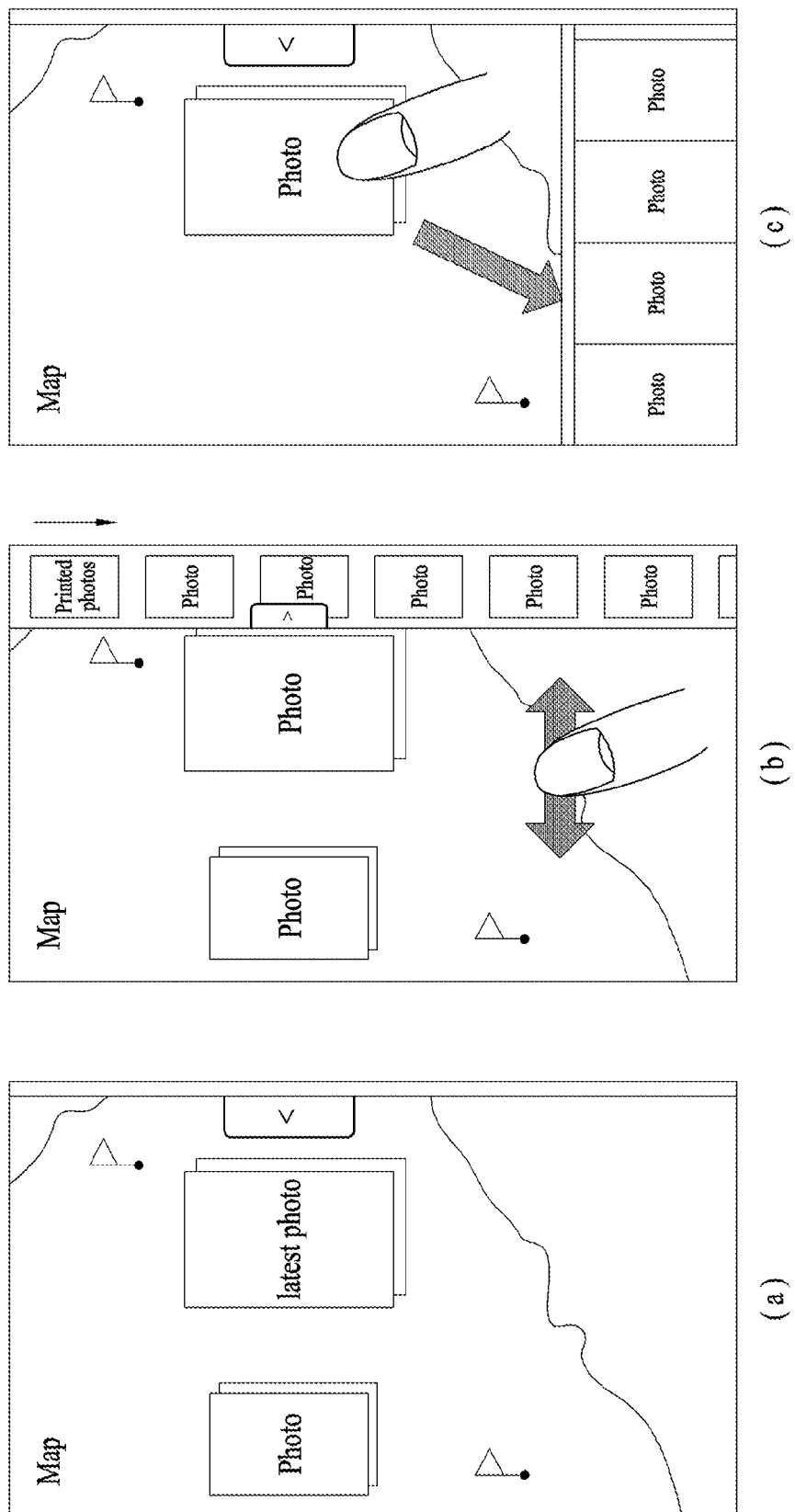
Figure 16:
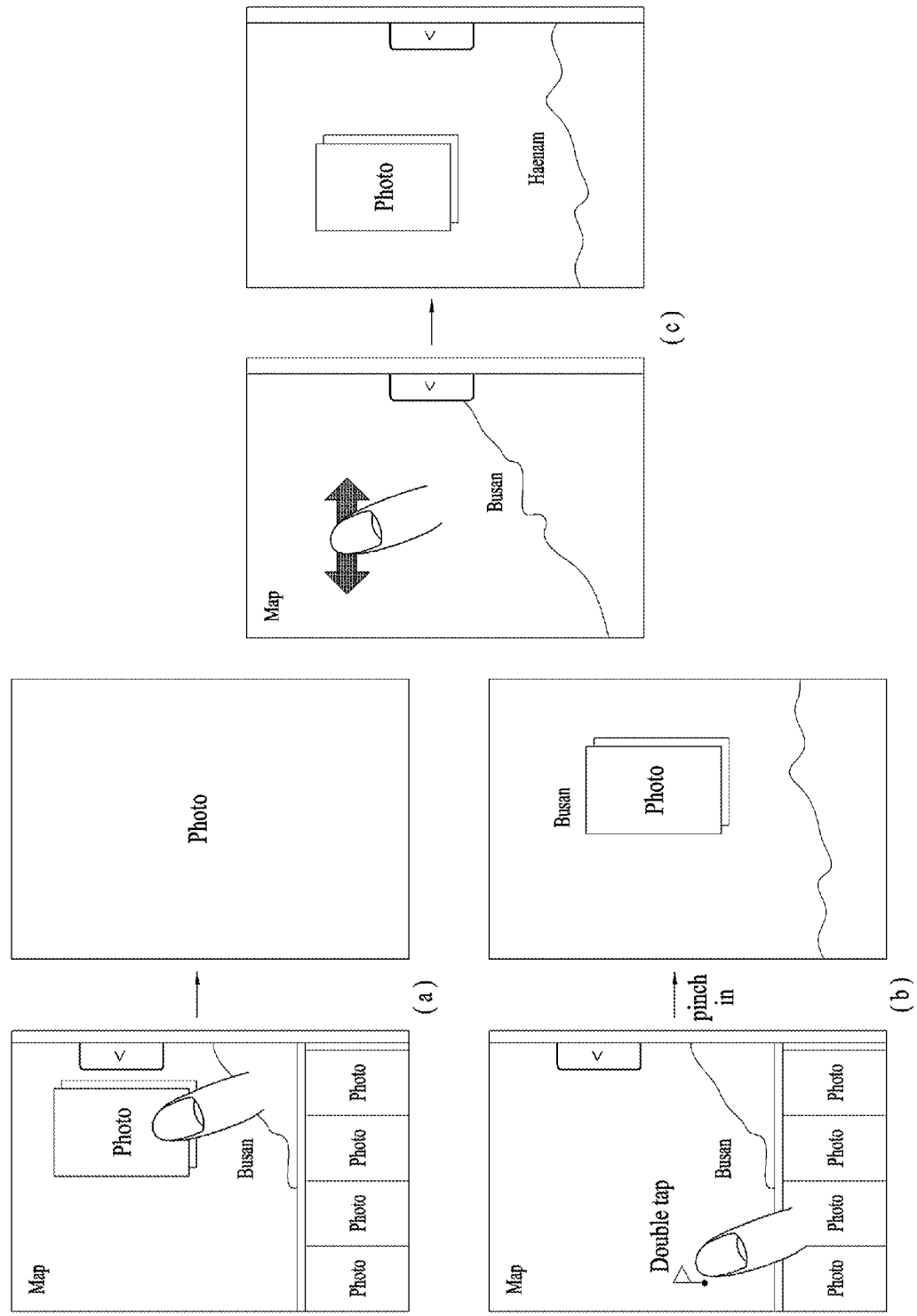

FIG. 15 and FIG. 16 are diagrams to describe another configuration of a geo gallery.

As mentioned in the foregoing description, there may exist numerous images to configure a geo gallery. And, it is necessary to sort the images by locations. To this end, a mobile terminal can combine images taken at a nearby area into a single album. In doing so, if the images differ from each other in date, different albums can be configured with the images.

Referring to FIG. 15 (a), a map location is focused centering on a most recently taken photo. Photos can be displayed in sizes increasing in order of recent photographing. In doing so, a user can set the number of images to be outputted and a map range in FIG. 15 (a). For instance, the user can set a most recent photo to be outputted in a mobile terminal and can also set photos taken domestically to be viewable only.

The mobile terminal implements a place including at least 10 images into an album and outputs a representative image of the album, thereby facilitating user's recognition. The mobile terminal provides a place including images less than 10 as a pin shape and enables the number of images to become identifiable using a numeral and the like. And, the identifiable recognition of the pin/album type is arbitrarily modifiable in accordance with user's settings.

Besides, the mobile terminal can provide each indicator with information such as a photographing place, a photographing time and the like as well as with the above reference.

FIG. 15 (a) may show an entry screen of the geo gallery. In this case, as mentioned in the foregoing description, a map is provided to a background and a most recently taken photo can be provided in largest size.

Referring to FIG. 15 (b), if a user action of shifting a bar of a right side end toward a left side is applied to the geo gallery entry screen, a history of a most recently taken image currently provided in FIG. 15 (a) is provided to a right side of the screen. In doing so, in FIG. 15 (b), representative photos of the printed album in the map can be displayed in order of recent photographing from the top. If a photo in the list is clicked, the corresponding photo can be displayed as a full screen. This may equal the screen configuration shown in FIG. 16 (b).

Referring to FIG. 15 (c), if the user clicks the album viewed on the map of the mobile terminal, photos in the clicked album are outputted to a bottom end of the screen.

Referring to FIG. 16 (a), the mobile terminal outputs the photo, which corresponds to the image click in the album selected by the user in FIG. 15 (c), as a full screen. In doing so, if the user scrolls the map in right-left direct, the mobile terminal can provide a previous/next photo and may return to a previous screen using a back key or the like.

Referring to FIG. 16 (b), when a user double taps the pin on the map, as the screen is enlarged or shifted to a corresponding area, the mobile terminal outputs a representative image or images including the representative image.

Finally, referring to FIG. 16 (c), if a user scrolls the map in top-bottom-right-left direction, the mobile terminal changes the map into an area in the corresponding direction and outputs an image for the corresponding area. In doing so, when the area shift is performed in response to a user's request, if there is no photos in the corresponding area, the mobile terminal displays a popup indicating 'no photos' to enable a shift to another area.

Besides, a geo gallery can be configured in a manner that a reduced scale of a map is automatically determined depending on the number of mapped images and the like. For instance, if there is one mapped image, it is able to configure a geo gallery having a large reduced scale, i.e., an enlarged geo gallery representing a specific area, a specific district or the like. If there are two mapped images, it is able to configure a geo gallery having a small reduced scale.

The determination of the reduced scale of the map may vary depending on a location at which an image is mapped to a map. In particular, although there are two images only, if image mapped locations are different from each other, it is able to determine a reduced scale of a map to enable the images to be simultaneously outputted depending on distances of the locations.

If images amounting to the number equal to or greater than a prescribed number are mapped to a map, it is difficult for a mobile terminal to enable a provided geo gallery to be intuitively recognizable. In this case, it is able to raise the probability of the intuitiveness in a manner of further lowering a reduced scale or providing a pin or the like according to a map application instead of an image. In particular, the number of the corresponding images, a photographed time of the corresponding image and/or the like is displayed on the pin, whereby user's convenience of recognition can be enhanced.

A geo gallery can be linked to a map application. For instance, in providing a geo gallery, a mobile terminal can implement the geo gallery differently depending on a user's status by activating a map application together. If the map application is activated, a reduced scale of a map can be variously modified and a map of a location to which a user belongs in accordance with GPS information can be implemented and provided. In connection with this, with reference to a location to which a user currently belongs in accordance with GPS information, an image possibly-mapped or previously-mapped to the current location or a location closest to the current location is provided to the geo gallery.

When the geo gallery is provided, it is provided on the basis of the user's current location. If the user changes a reduced scale of the map through a pinch-in or -out action, the mapped images can appear on the geo gallery.

In case that a plurality of images are linked to a single place on a geo gallery, a representative image of the images, the number of images associated with the corresponding image, photographed time information of the images associated with the corresponding image and the like can be provided.

In case that images are linked to a plurality of places on a geo gallery, the geo gallery can be configured in a manner that sizes of the images are differentiated from each other based on photographed times, respectively. For instance, a recently taken image is displayed on the geo gallery in a manner of having a relatively large size and a previously taken image is displayed on the geo gallery in a manner of having a relatively small size, whereby user's convenience of recognition can be enhanced.

A geo gallery can facilitate user's recognition of a user-travelling sequence in a manner of marking an order (e.g., a numeral, etc.) on an image of each of a plurality of places on a map or a sequence of visiting each mapped place using an arrow or the like.

A geo gallery can be configured to be selectable by administrative areas. If a single administrative area is selected, the selected administrative area is configured as a full screen and a mapped image can be corrected in appropriate size. In this case, the administrative area may correspond to one of Do, Si, Gun, Gu, Eub, Myun and the like with reference to administrative district definitions of Korea. And, the administrative area may vary depending on user's settings.

Meanwhile, a geo gallery can be configured for a domestic usage or an overseas usage. In particular, a geo gallery can be individually configured depending on a location of an image mapped onto a map.

FIG. 17 is a diagram to describe an intelligent gallery.

In this case, when a mobile terminal user uses a specific application, the intelligent gallery is one example of configuring an image gallery based on an obtained intention of the user.

FIG. 17 (a) is a diagram for a configuration of a phone application. And, FIG. 17 (b) is a diagram for a configuration of an intelligent gallery.

Applications mainly used by a user in a mobile terminal include a message application for a message composition and delivery and a phone application for a phone call.

Referring to FIG. 17 (a), a phone call list is illustrated. The mobile phone obtains a person, to whom a user of a mobile terminal has made phone calls most frequently, from a recent call list and a call list. Subsequently, the mobile terminal selects an image containing the obtained person and then uses the selected image as a background image of a home screen and/or a lock screen. Meanwhile, the call list provides successful call contents, call failure contents and message transceiving contents. In this case, the call failure contents can be referred to for configuring an intelligent gallery. In particular, if the call failure corresponds not to a case that a user is unable to answer a phone call but to a case that a user intentionally avoids a phone call, a corresponding person is excluded from the intelligent gallery configuration. In doing so, if the call failure person is included in an image including a plurality of persons, the corresponding image is excluded from the intelligent gallery configuration. Regarding the message transceiving contents, a user's intention is analyzed by analyzing contents of a message exchanged with a corresponding person. For instance, if a message content mainly corresponds to a business content, a discussion content or the like, a person with which the corresponding message is transceived can be excluded from the intelligent gallery configuration as well. On the other hand, if an emoticon and a warm message are considerably disclosed in a corresponding message, a weight can be given to the corresponding image to be included in an intelligent gallery. In case of such a message content or a call, it is able to implement an intelligent gallery through a user's voice analysis, a voice sound level (dB) and the like. And, a corresponding analysis factor can use a user's setting or a preset default factor.

Although the above description mainly concerns the intelligent application configuration based on the user's intention analysis using the call application, at least one or more other applications can be further referred to. For instance, it is able to utilize such tagging information as the number of printings, an SNS comment, a video call and the like.

The intelligent gallery can be implemented not only as a home screen or a lock screen but also as a separate gallery, as shown in FIG. 17 (b). And, the intelligent gallery can be provided in case of activation of another application.

Referring to FIG. 17 (b), an image having a greatest number of printings among images taken with a recently called person can be displayed as a home screen or a lock screen. If a user selects a corresponding person from the lock screen or the home screen shown in FIG. 17 (b), a call or message sending window can be directly provided as shown in FIG. 18.

Figure 18:
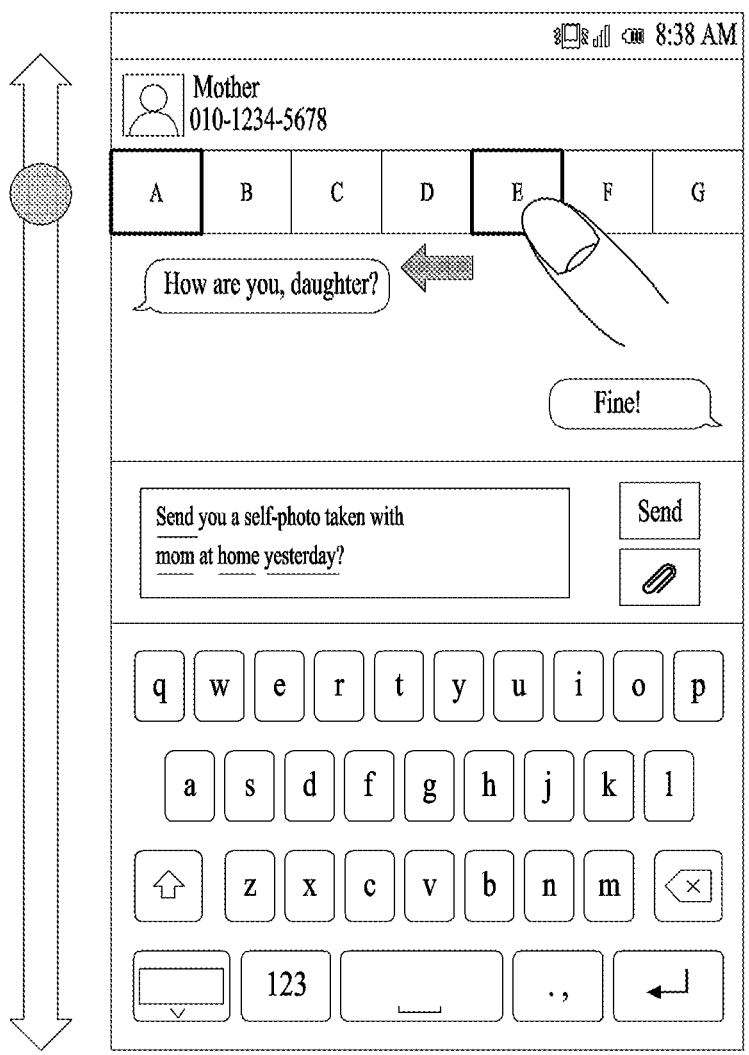
FIG. 18 and FIG. 19 are diagrams to describe an intelligent gallery linked to a messenger application.

As mentioned in the above description, FIG. 18 may be switched from FIG. 17 (b) or may not.

The latter case is mainly explained in the following description. For instance, assume that a user exchanges messages with a specific user through a mobile terminal.

For example, as mentioned in the foregoing description with reference to FIG. 17, when a counterpart having a chat through messages is a frequently chatted counterpart, if a message window is provided, recent printable images are provided to a prescribed region in direct. If the user takes an action (e.g., a drag & drop) on at least one of the printable images, the selected at least one printable image is sent to the counterpart in direct.

Meanwhile, according to the above substance, although the specific user is not the previously obtained user mentioned in the description with reference to FIG. 17, i.e., if the user activates a message application and the message is then provided, a printable image list can be automatically provided in response to a user's input to the message window.

In particular, after various factors of time information, location information, character information, job information and the like has been obtained from analyzing a user's input message, the mobile terminal provides all printable images including at least one information related to the various factors. In this case, the user can send a selected printable image to the counterpart easily and conveniently in a manner of selecting a prescribed printable image or taking a prescribe action. Meanwhile, an image received from the counterpart can be included in various galleries in a manner of being analyzed.

Figure 19:
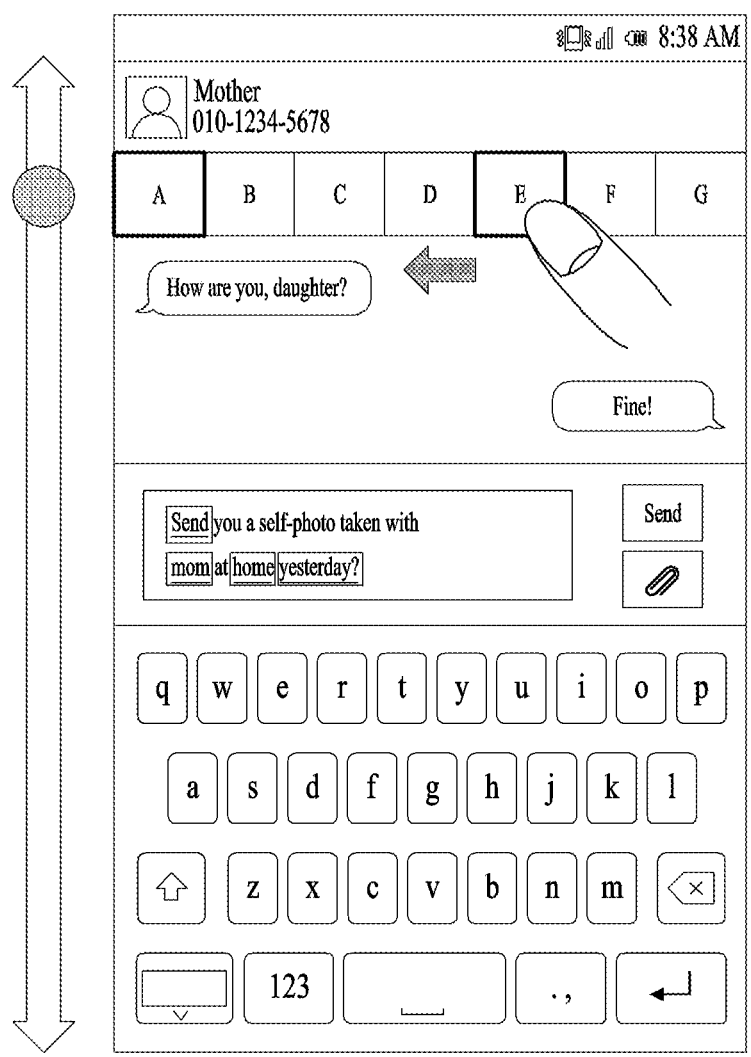

According to the above description, the images shown in FIG. 18 or FIG. 19 can be provided as a slide show like a movie film.

Moreover, like FIG. 17, when a text is analyzed, information is interpreted based on NLU (natural language understanding) and images are sequentially provided in a manner that an image closest to a user's intention among the images is provided to a most left side and so on. Alternatively, the images can be provided to a left side and so on in order of time based on time information of the images.

In FIG. 18 or FIG. 19, if the user selects the prescribed image, it is able to provide a user interface to perform such a function as an enlarged view, a printing, an upload to SNS or the like, a sharing and the like. As mentioned in the foregoing description, the printable image saved in the mobile terminal by the mobile terminal user and the image received from the counterpart or the like are simultaneously provided to the same region or different regions. In doing so, in order to determine whether a prescribed image is the received image, indicators or different colors may be provided to the corresponding images, respectively.

Figure 20:
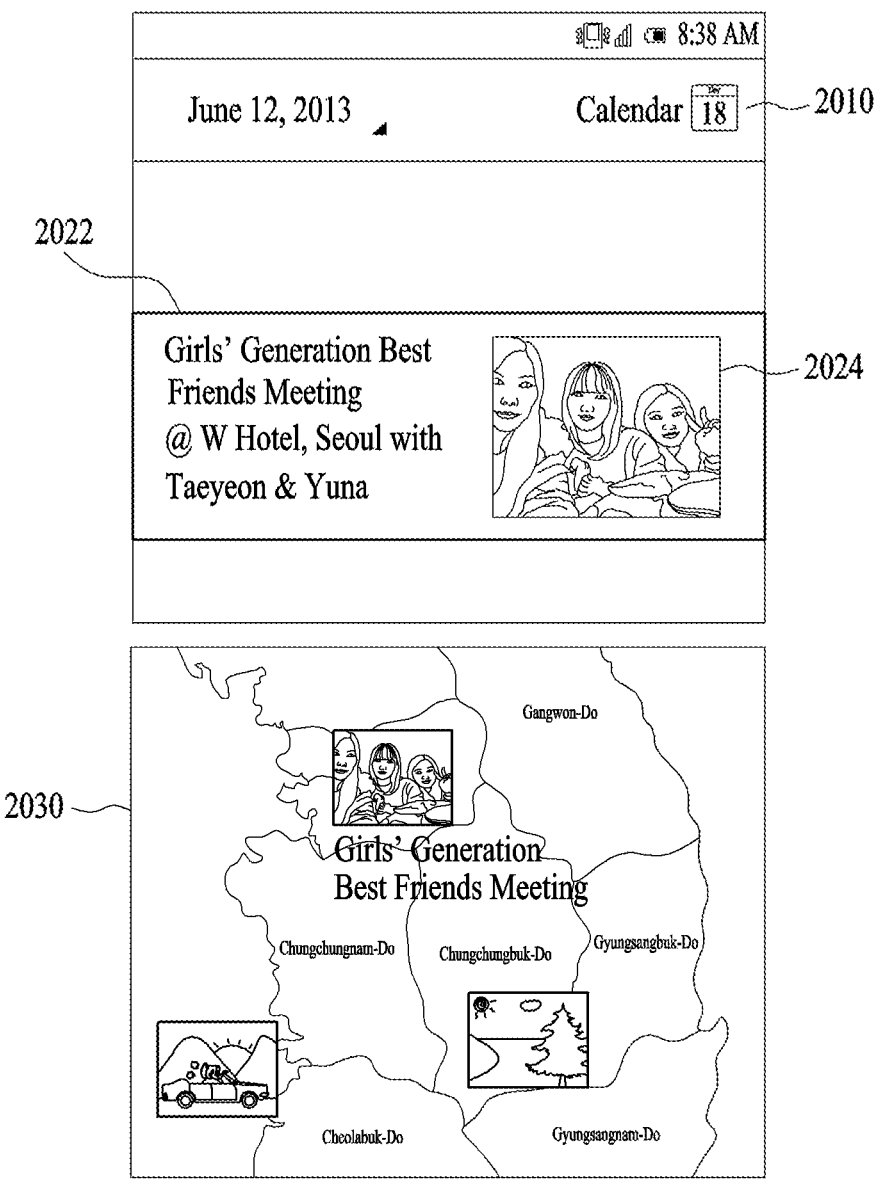
FIG. 20 and FIG. 21 are diagrams to describe a calendar gallery configuration.
Figure 21:
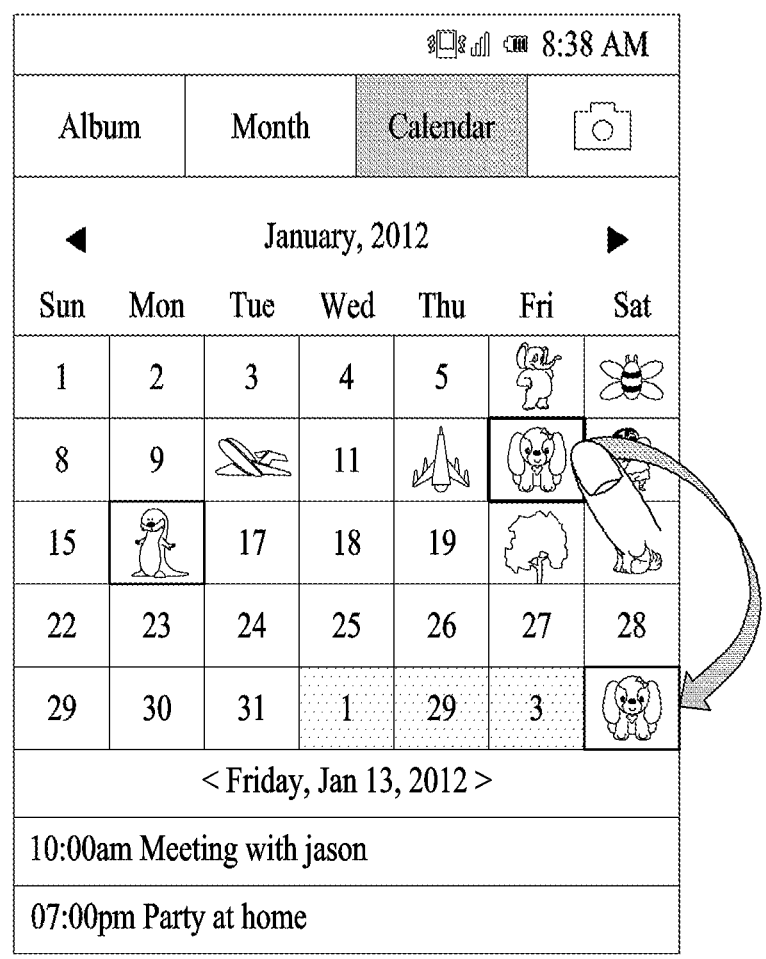

FIG. 20 and FIG. 21 are diagrams to describe a calendar gallery configuration.

Referring to FIG. 20, regarding a calendar gallery, if a user photographs a subject, a calendar application or a schedule related application (hereinafter called a calendar application) is activated manually or automatically and an image photographed at a corresponding time is provided as schedule information of the calendar application.

If the calendar application is activated, a mobile terminal activates a map application (or a geo gallery) within a screen in a manner of linking the map application to the calendar application based on location information of the mobile terminal through a user's title input, a GPS or the like for an image. The image is mapped to the corresponding location and tagged.

The mobile terminal is able to automatically generate an album based on the location information, which is inputted by the user at a corresponding time of the calendar application, and information on a subject within the image. This album is generated as a selectable item in a manner of being included in a list in order to be selected at a time between an initially subject-photographed time and a last subject-photographed time. This item can be intuitively recognized by outputting a representative image among the photographed images together. If the representative image 2024 is selected, the mobile terminal provides the photographed image by enlarging the corresponding image and is able to output title information as well.

Referring to FIG. 21, a calendar gallery can be implemented by monthly units. So to speak, FIG. 21 shows one example of an implementation of a calendar gallery by monthly units, whereas FIG. 20 shows one example of an implementation of a calendar gallery by daily units.

Regarding the calendar gallery shown in FIG. 21, a representative image is selected from a plurality of images photographed on a corresponding day of a corresponding month with reference to a date of photographing a printed image and the selected image is then provided as an image album of the corresponding day.

When one image is selected from the calendar gallery shown in FIG. 21, if there is a schedule on a date corresponding to the selected image, it is able to provide corresponding schedule information 2150 to a screen.

Meanwhile, each item in the calendar gallery shown in FIG. 21 implements its outline differently in accordance with the number of printed images on the corresponding day or the number of printings on the corresponding day, thereby implementing the image on the corresponding day stereoscopically like a 3D image.

A main background screen of the calendar gallery shown in FIG. 21 can be provided in a manner of using an image having the biggest number of printings in a corresponding month as a representative image. In doing so, in order to provide calendar information, it is able to provide the representative image based on semi-transparency, a user selection and the like. If there is not printed image in the corresponding month or the representative image is not selected in response to a user's selection, a basic image can be used as a background.

In the above description, the representative image may include a best show, which will be described later, or an image photographed and printed in the first place on the corresponding day. Alternatively, the representative image may include an image having a most frequently printed history on the corresponding day. Meanwhile, if there is no photographed image in the schedule, a basic background image can be used as a substitute image.

So to speak, when a user intends to view images in order of date, if the images are just sorted in order of date, it may be difficult to discover a desired image. In particular, the mobile terminal may have difficulty in discovering an image most frequently printed or SNS-uploaded at a glance. Moreover, in order to view time information on an image, it may require several steps. For instance, in a mobile terminal, it is able to view time information on an image through steps of a gallery selection, a folder selection, a photo selection, detailed information selection and the like.

Therefore, in the present specification, a gallery can be configured further intuitively and easily in a manner of linking to a calendar based on a use history of an image.

For instance, a mobile terminal automatically synchronizes a bet shot of a corresponding date with a calendar. In particular, a best shot on a photographed day is used as a background of the corresponding date. In doing so, it is able to select the best shot in order of a higher frequency of printing, sharing or editing. For instance, an image having the big number of printings, an image frequently uploaded to an SNS becomes the best shot.

If a date is clicked in a calendar, a calendar gallery can provide a schedule of the corresponding date in a mobile terminal. This function can be maintained intact even if the calendar gallery is implemented as a function of an existing calendar application. On the other hand, such a function is combined with a calendar gallery function, whereby a related image can be mapped to a corresponding schedule.

If there is no image on a corresponding date, a basic background is provided. In particular, semi-transparency, color, pattern, default photo and the like can be selected by a user for the basic background. And, a photo designated by a user can be selected as a basic background of the date having no image.

Meanwhile, if an image mapped to a calendar gallery is selected, the geo gallery shown in FIG. 20 is automatically activated and provided to the screen [not shown in FIG. 21].

FIG. 22 is a diagram to describe an embodiment of configuring a notebook gallery. And, FIG. 23 is a diagram to describe a method of printing an image in an album of the notebook gallery shown in FIG. 22.

A notebook gallery can be generated from an existing gallery application or another gallery mentioned in the foregoing description. Yet, for clarity of the following description, assume that a notebook gallery is linked to a calendar gallery.

FIG. 22 (*a*) shows on embodiment of a calendar gallery. And, FIG. 22 (*b*) shows one embodiment of a notebook gallery for generating and saving an album by being linked to the calendar gallery shown in FIG. 22 (*a*). Moreover, the calendar gallery shown in FIG. 22 (*a*) can be generated by the former description with reference to FIG. 20 or FIG. 21.

Referring to FIG. 22 (*a*), a representative image is provided to each date according to the former description with reference to FIG. 20 or FIG. 21. And, the corresponding representative image can include at least one or more images on the corresponding date. After a user has taken an action on a representative image of a date after the provision of the calendar gallery or the representative image of the corresponding date, a mobile terminal automatically activates a notebook gallery to be linked to the calendar gallery [FIG. 22 (*b*)].

In this case, the user's action may include one of various actions including a drag & drop action, a pinch-in action, a pinch-out action, a long press and the like. For instance, referring to FIG. 22 (*a*), if a user presses a prescribed representative image long, a notebook application is automatically activated. Subsequently, if the user drags and drops the representative image onto the notebook application, an album 2252 is automatically generated by including images of the corresponding date as well as the corresponding representative image. In this case, the alum 2252 may be named a photo note attributed to the features of the notebook gallery.

In case that the representative image selected in FIG. 22 (*a*) includes images of a plurality of different categories, a plurality of albums can be generated automatically in accordance with the sorting of images of the calendar gallery. For instance, photos photographed at 'Gangnam Station' in the morning on Mar. 16, 2013 exist and photos photographed at 'Jong-Ro' in the afternoon on Mar. 16, 2013. Although an image photographed at 'Gangnam Station' is provided as a representative image in order of time, a plurality of representative images are provided in response to a user's action and a notebook gallery is generated in a manner that images including the representative image selected by the user are arranged as an album on the notebook application.

Referring to FIG. 22 (*b*), the generated notebook gallery album can be outputted together with a representative image, time information and title information such as a title and the like.

Meanwhile, the notebook application shown in FIG. 22 (*b*) includes a synchronization button 2260. If the user presses the synchronization button 2260, all images by daily units and monthly units of the calendar gallery are generated as albums 2254 and 2256 with reference to representative images. For instance, the automatically generated albums may be sequentially generated in order of time.

So far, the configuration of the notebook gallery is described with reference to FIG. 22. In the following description, a method of printing an album or images in the album in a notebook gallery is explained with reference to FIG. 23.

FIG. 23 (*a*) shows one embodiment of a notebook gallery including albums. If a user takes an action on one of the albums on the notebook gallery [FIG. 23 (*a*)], a mobile terminal provides a popup window [FIG. 23 (*b*)].

In doing so, as mentioned in the foregoing description, the action may include at least one of a drag & drop action, a pinch-in action, a pinch-out action, a long press action and the like.

If the album on the notebook gallery is pressed long, the mobile terminal provides the popup window shown in FIG. 23 (*b*). In this case, the popup window can provide various items including 'print using pocket photo', 'share', 'delete', 'lock this note', 'export this note', 'add to home screen' and the like.

If the user selects a prescribed item from the items shown in FIG. 23 (*b*), the mobile terminal performs the following processing in accordance with the selected item. For instance, assume that the item 'print using pocket photo' is selected in FIG. 23 (*b*). The mobile terminal performs a pairing with a printable device, i.e., a pocket photo, in the first place. If the paring is complete, the mobile terminal obtains the number of images in the selected album and determines the number of images outputtable through the paired pocket photo. As a result of the determination, if the number of the images in the album is greater than the number of the outputtable images, the mobile terminal informs the user of the situation of the pocket photo and then requests a user's action. In this case, the requested user's action may include a charging the photo pocket with printable papers or the like for example. Moreover, when the corresponding album is selected as a result of the determination or irrespective of the determination, if the images are partially outputted depending on a user's selection for whether to output the whole album or the partial images in the album, the outputted images can be provided in a manner of overlaying the notebook gallery in order for each of the images in the corresponding album to become selectable for convenience of the selection. In doing so, the substance of the determination on whether to print images and the like in association with the pocket photo is identically or similarly applicable to the printings in other galleries.

Figure 24:
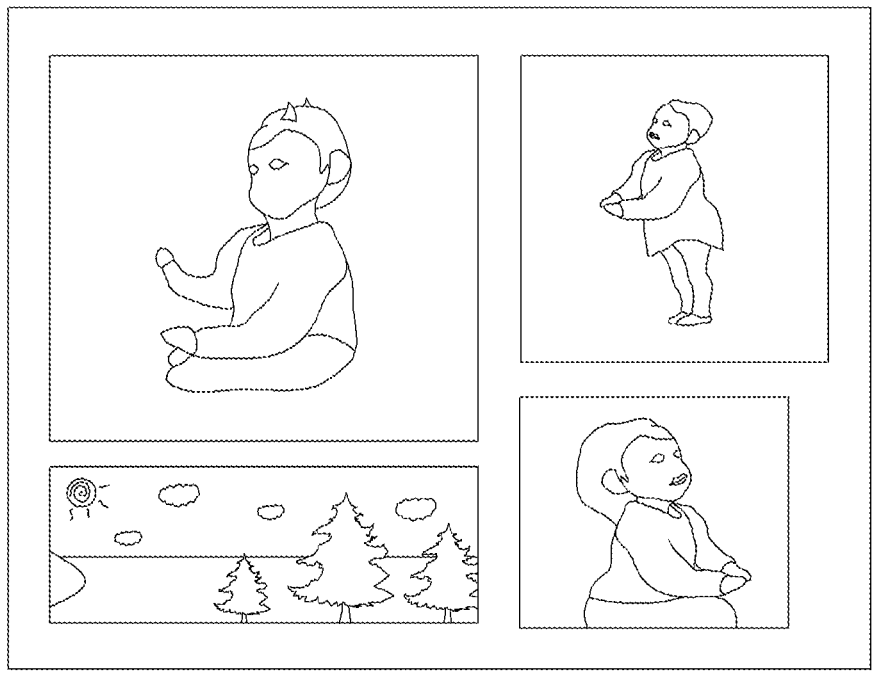
FIG. 24 is a diagram to describe a method of generating a best shot from images according to one embodiment.

FIG. 24 is a diagram to describe a method of generating a best shot from images according to one embodiment.

Generally, if a plurality of images exist in a single category, it takes a considerable time to determine which one of the images will be printed. For instance, a user visits a tree garden and photographs lots of images. In case of attempting to print several photographed images through a printable device, all the images are checked one by one and a best show is selected from the checked images in general. Such a process may take a considerable time depending on the number of the images.

In consideration of such a user's need, the present specification discloses a method of automatically determining and recommending at least one best shot in a mobile terminal.

In particular, a method of determining a best show in a mobile terminal should obtain a user's intention well. Generally, an image to be printed may include a clean-shot photo to be viewed by others. To this end, the mobile terminal automatically determines and recommends best shot candidates amounting to a desired number among photos taken in a predetermined period or on predetermined conditions by calculating a point of each of the images. Therefore, it is able to minimize user's inconvenience in checking and selecting all images one by one.

Meanwhile, the mobile terminal can configure the best shot candidates to be directly changeable in a manner that an image connected previous or next to each of the recommended best shot candidates can be checked in response to a user's action.

The above-mentioned point calculation for the best shot determination can be performed in a following manner. First of all, for the weight, a composition in a corresponding image, a shaking extent, the number of SNS sharings or uploads or the like, the number of photo transmissions to a third party, the number of paging a corresponding image in a gallery and the like are used as best shot factors. Secondly, points of the images are generalized using the best shot factors. Finally, the best shot candidates are selected as many as the number desired by a user by starting with the image having a highest point.

On the other hand, in selecting the best shot candidates, the mobile terminal can further refer to factors including a predetermined period, a predetermined time, a character through a face tagging, a category, a folder, a full photo, the number of recommendations and the like for the best shot candidate selection.

FIG. 24 shows one example of a best shot recommended to a user in a mobile terminal.

Referring to FIG. 24, each image is provided in different size, which may be related to order of a best shot. In particular, according to the aforementioned point calculation, a best shot of highest order can be controlled to have a biggest size, while a best shot candidate of subordinate order can be controlled to have a relatively small size.

Meanwhile, the mobile terminal can provide a weekly best shot, a monthly best shot or the like as a popup in case of entering a gallery.

FIGS. 25 to 29 are diagrams to describe a method of generating an active album.

FIGS. 25 to 30 refer to a best shot method similar to that shown in FIG. 24.

Similarly to the former description, while images are viewed though a gallery, prescribed images may be attempted to be shared or printed in direct. Yet, such a process is complicated, whereby mobile terminal users may avoid the process. Particularly, after a photo has been taken together with several persons, if a best shot is selected for printing, it may be difficult to select the best shot. In this case, if an image to be printed is shared with another person, it is inconvenient to activate a messenger application, an SNS application or the like separately.

To settle such inconvenience, in the present invention, an active album is automatically generated.

A method of generating an active album is described as follows.

Figure 25:
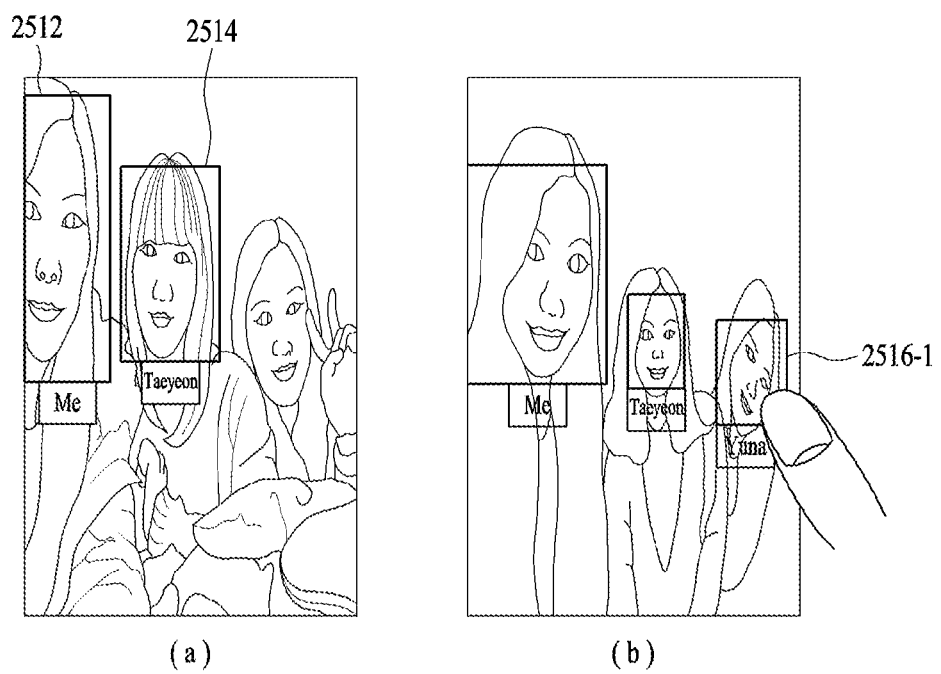
FIGS. 25 to 29 are diagrams to describe a method of generating an active album.

First of all, referring to FIG. 25, an active album is provided to be shared with persons tagged in case that several subjects exist in an image included in a gallery. In doing so, a tagging may be automatically performed by a mobile terminal.

Information on a tagged person from an image may refer to such an application as an address book saved in the mobile terminal for example.

The above-mentioned active album is generated as a person connected to a printable device, i.e., a pocket photo, becomes a host or a server. And, the active album is connected to a mobile terminal of a tagged person by a prescribed communication protocol. In this case, the prescribed communication protocol may include one of various systems including Bluetooth, Wi-Fi, DLNA and the like. In particular, the communication protocol can include all kinds of protocols capable of image transmission and reception by including a return channel for a response to a transmission of the active album.

The active album is further described in detail with reference to FIG. 25 as follows.

FIG. 25 (a) shows a case that an automatic tagging is performed by a mobile terminal. FIG. 25 (b) shows a case that a tag may be added by a user.

Referring to FIG. 25 (a), 3 subjects (persons) 2512, 2514 and 2515 are photographed. Yet, a mobile terminal tags two subjects 2512 and 2514 only. This is because a size of the remaining subject 2516 is not big enough for the mobile terminal to tag the corresponding subject, or the tagging may follow attributes of the subjects. Thereafter, referring to FIG. 25 (b), a user is able to add a tagging by selecting the non-tagged subject 2516-1 in the mobile terminal.

On the other hand, the mobile terminal can refer to various kinds of information for a tagging. For instance, the mobile terminal can refer to an image for a tagging among images in an address book or a gallery. And, the mobile terminal can refer to a previous tagging history and the like. Moreover, if a user manually adds a tagging through the mobile terminal, as shown in FIG. 25 (b), it can be referred to for a next tagging.

Figure 26:
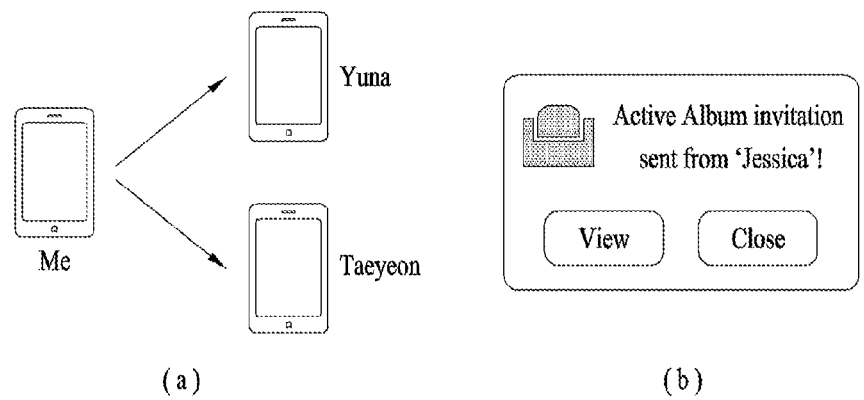

FIG. 26 shows a method of generating an active album for a subject tagged by a mobile terminal like FIG. 25 and then transmitting the active album to a mobile terminal of the corresponding subject.

Referring to FIG. 26 (a), as mentioned in the foregoing description, a mobile terminal generates an active album, extracts mobile terminal information, address information and the like for a subject included in the generated active album, and then transmits the extracted information through a connected network. The transmitted active album may be outputted as a configuration shown in FIG. 26 (b) from a mobile terminal of each subject. Meanwhile, the active album is automatically transmitted using such a messenger application as MMS, Kakao Talk and the like or such an SNS as Twitter, Facebook and the like.

As mentioned in the foregoing description with reference to FIG. 26, after the active album has been transmitted, a response to select a best shot through the transmitted active album may be requested. This response is made through a return channel of the corresponding network. In particular, referring to FIG. 27, the images 2712, 2714, 2716 and 2718 of the transmitted active album are provided at a time and each of the images is provided with an identifier 2720 and a best shot preference icon (e.g., a heart FIG. 2732/2734. In this case, the preference icon may include a filled-up heart 2732 or an empty heart 2734. The former may indicate a presence of preference, while the latter may indicate a non-presence of preference. If the empty heart is selected, it turns into the filled-up heart and may keep turning in response to a later selection. Moreover, if each of the images configuring the active album is selected, the corresponding mobile terminal can control the selected image to be provided in a manner of being enlarged.

The active album shown in FIG. 26 may have a screen configuration that varies by real time depending on a preference icon. For instance, Although the image of the identifier #2 was a most preferred best shot candidate, if another identifier image become a more preferred one by real time as a result of preference selection, a location of the corresponding image may be changed. In particular, the image composition is changed by real time depending on a preference selection, whereby a size of the corresponding image may change.

Figure 27:
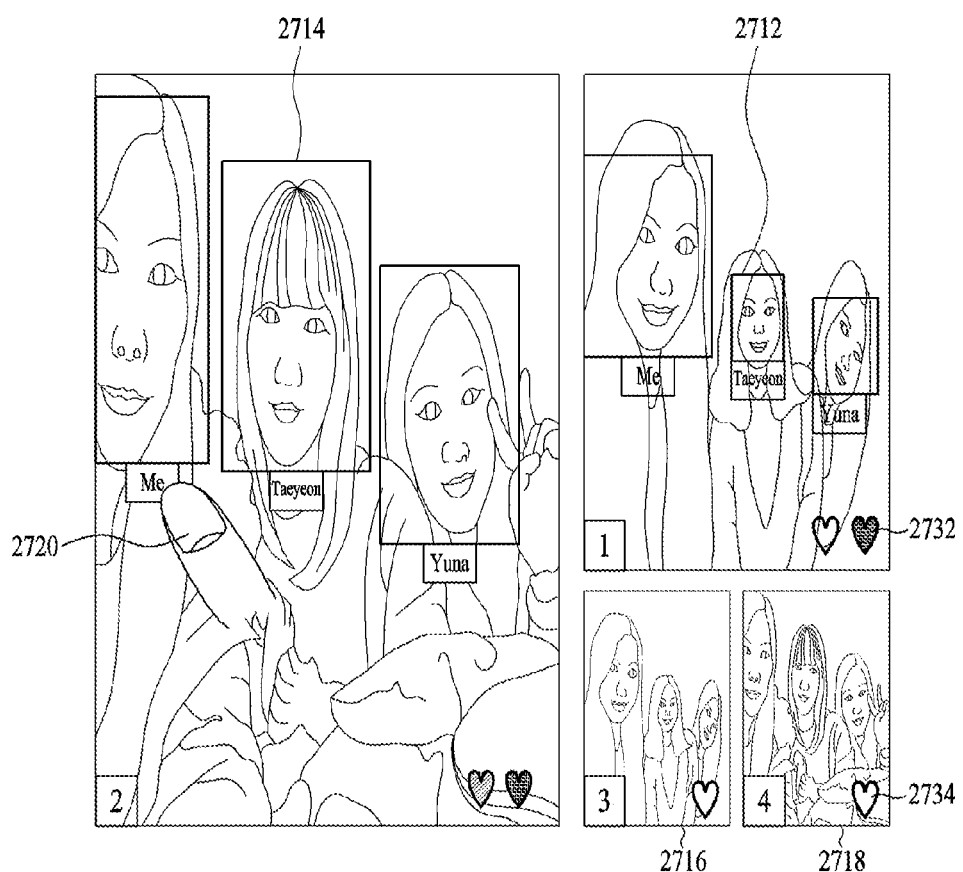

Meanwhile, in FIG. 27, a comment can be posted to the active album shown in FIG. 26, which can be reflected by real time.

Referring to FIG. 26 and FIG. 27, the mobile terminal can check a result of preference to each image in the active album and a comment result. Meanwhile, a host or a different mobile terminal can perform an editing on each best shot candidate image on the active album. Such editing can be reflected by real time and may be adopted by the host. In this case, the host can grant the editing.

Figure 28:
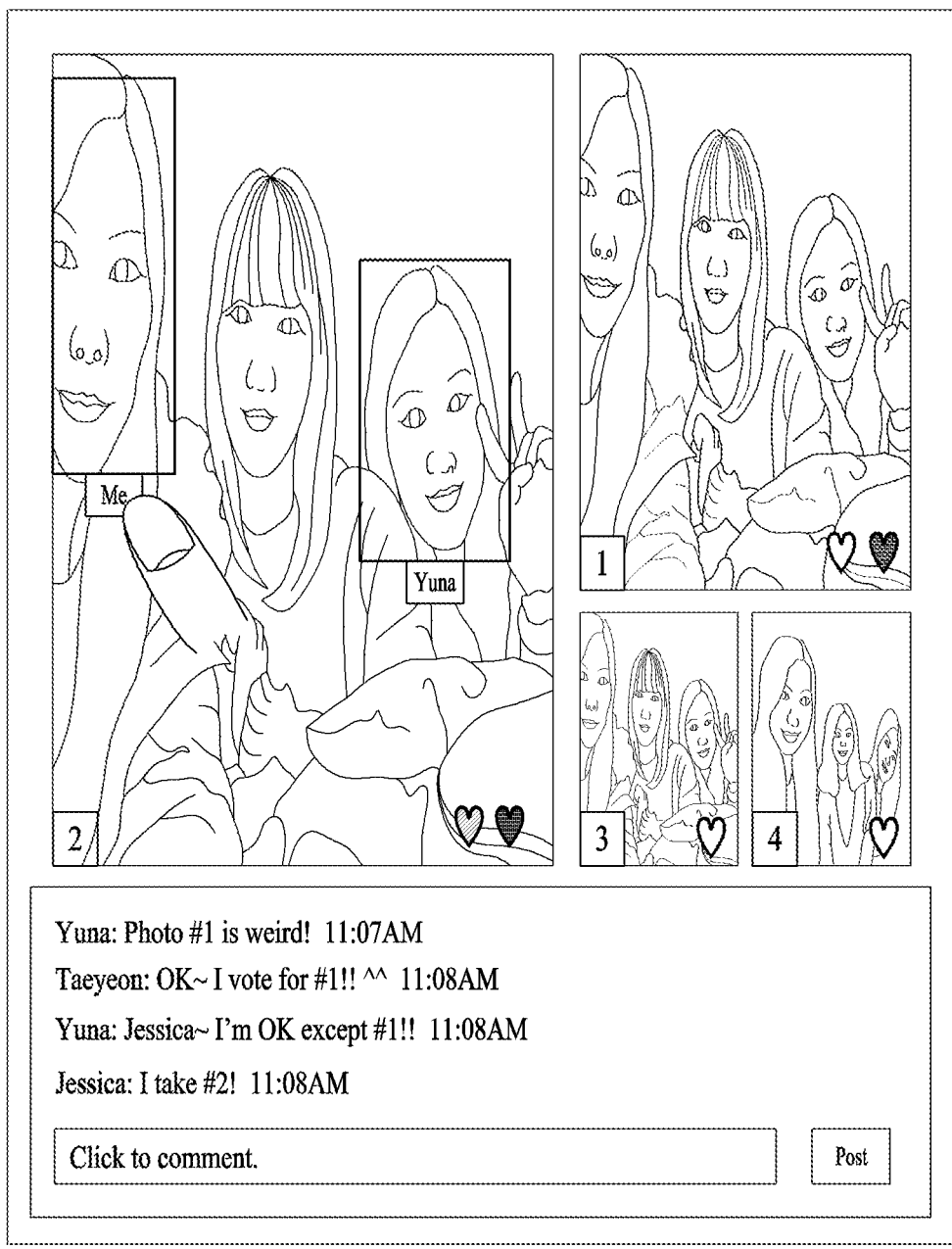

Referring to FIG. 28, after the active album transmission, if an editing related comment or request is made by a different mobile terminal user or a host in the screen shown in FIG. 26 or FIG. 27, a host mobile terminal pages an editing tool through an editing icon and is then able to edit the corresponding image on the active album in direct. This editing process may be reflected by real time in each mobile terminal having received the active album. Moreover, the editing or the like may be performed not only by the host mobile terminal but also by the different mobile terminal having received the active album. Yet, when the editing is performed not by the host mobile terminal but by the different mobile terminal, if the corresponding image is finally selected as a best shot, editing information used for the corresponding editing can be transmitted to the host mobile terminal that prints the selected best shot image.

Figure 29:
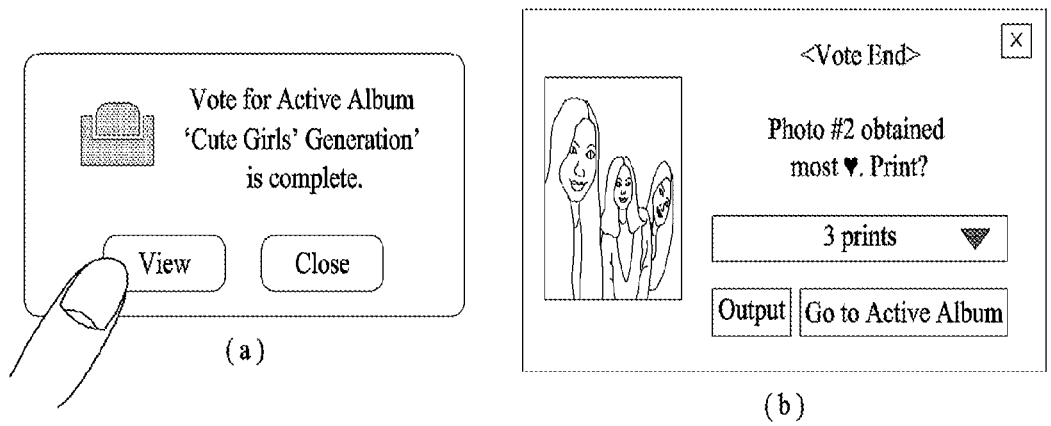

Referring to FIG. 29 (*a*), if a final best shot candidate selecting vote for the active album is ended through the process shown FIGS. 25 to 28, information indicating that the active album has been ended is transmitted from the host to the different mobile terminal. If 'view' is selected in FIG. 29 (*a*), the host mobile terminal enables a finally selected best shot image, a text for the image (e.g., 'Photo #2 gains the most votes. Print?') and the number of outputs to be selected and provides 'output' and a path to return to the active album 'go to active album'.

Figure 30:
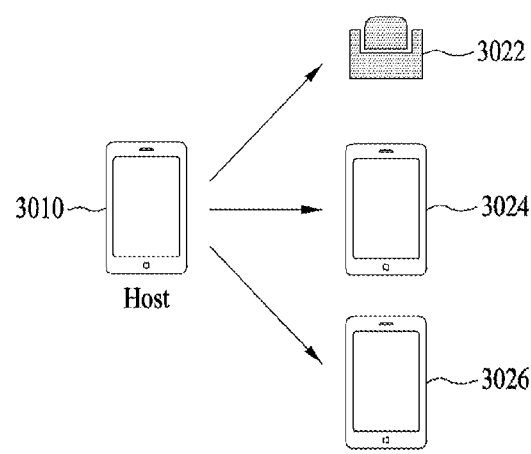

FIG. 30 and FIG. 31 are diagrams to describe a method of transmitting a printable image. In this case, FIG. 30 and FIG. 31 may correspond to the processing after the active album shown in FIGS. 25 to 29 for example or may not.

A method of sharing a printable image automatically and easily is described with reference to FIG. 30 and FIG. 31.

In a related art mobile terminal, if an original copy of a printed image is intended to be shared with a third party, it is inconvenient to activate a messenger application and the like.

In the present specification, a printable image can be transmitted to mobile terminals of subjects, which are added by an automatic tagging or a manual tagging in the aforementioned active album, simultaneously at a time without a separate user's input.

Referring to FIG. 30, if a request for printing an image through a printable device, i.e., a pocket photo, is made, a host mobile terminal transmits the image to mobile terminals of subjects tagged through the image simultaneously. In doing so, if the mobile terminal of the tagged subject is located in a short distance, the image is transmitted using such a network protocol as NFC, Bluetooth, USB cable, DLNA, Smart share and the like. If the mobile terminal of the tagged subject is located in a long distance, the image can be transmitted using such a messenger application as MMS, Kakao Talk and the like or such an SNS protocol as Twitter, Facebook and the like.

Meanwhile, referring to FIG. 31 (*a*), if a user does not make a separate printing request or a request for transmitting a printable image to a different mobile terminal, an image can be transmitted to a printable device 3122 and subject mobile terminals 3124 and 3126 by just tagging subjects 3112, 3114 and 3116 in the image 3110 of a gallery. Meanwhile, in doing so, a host mobile terminal tags itself in the image so as to be regarded as making a request for printing an image through the printable device automatically.

FIG. 31 (*b*) shows a case that a panorama image is shared not through a single mobile terminal but through a plurality of mobile terminals. For instance, in order to share a screen supposed to be filled up in case of a panorama shot photographing, when devices are paired with each other, it is possible to enlarge a panorama region by filling up a panorama shot photographing region. This is useful in photographing and sharing a trekking image intended to be photographed and shared in the course of a trekking or intending to view a photo taken in a horse racing or sports game through a single combined screen. Alternatively, the case shown in FIG. 31 (*b*) is useful in intending to view an enlarged screen in a gallery one by one.

FIG. 32 is a diagram to describe a method of sorting photos in a gallery automatically based on a print history and photo utilized information.

Since a number of images can exist in a mobile terminal, the mobile terminal requires a considerable storage space so as to affect performance of the mobile terminal.

FIG. 32 shows a method of automatically sorting photos. Referring to FIG. 32, if a user designates the number (e.g., 30, etc.) of photos to view in a gallery in advance, a mobile terminal sets a level of each image saved in the mobile terminal. In this case, the level may be set with reference to a printing history, the number of sharing, the number of views in full screen, a photographing time and the like for example. Meanwhile, the level is not set for an image for which a protective function was previously set by a user and the corresponding image is maintained intact.

Referring to FIG. 32 (*a*), as a gallery application is activated, each image is currently outputted. In doing so, all images saved in the mobile terminal are outputted in equal size. Meanwhile, indicators are outputted to a bottom end of a screen so as to become references for a user's selection or an output image sorting in association with the levels. Meanwhile, the respective indicators may differ from each other in color, size and the like depending on the information to indicate. For instance, the indicators, which start with a most left indicator, may correspond to 1 day ago, 2 days ago, week ago, month ago and year ago in order, respectively.

Hence, when a user intends to automatically sort the images, if the user selects one of the indicators to sort the images, images corresponding to the selected indicator are outputted only but the rest of the images disappear from the mobile terminal screen.

Subsequently, after the user has selected the images to store (i.e., the images not to sort) from the sorted images or the images to sort, if the user takes a shaking action (or gesture) with a user's hand by moving the mobile terminal right and left [FIG. 32 (b)], the rest of the images are automatically sorted except the selected images. In the latter case, the selected images are automatically sorted only. In doing so, the automatically sorted images may be deleted in direct or may be reduced in size by turning into a compressed file.

Referring to FIG. 32 (c), the images are sorted in order of higher level in response to the aforementioned user's image sorting request in a manner of starting with the image having the highest level, i.e., a top priority to retain. In this case, the image having the high level can be differentiated in resolution, size, outline color and the like in comparison with the image having a relatively low level.

FIG. 32 (d) shows one example that the mobile terminal has manually changed the level in response to a user's action in FIG. 32 (c). Namely, in FIG. 32 (c), as mentioned in the foregoing description, the mobile terminal automatically gives the level to each of the images and then automatically sorts the images. This may not cope with the user's needs or intentions necessarily, or the user may change his mind in course of time. Hence, after the automatic sorting, the user can manually readjust the sorting. In case of performing the readjustment, the mobile terminal recalculates the level of the readjusted image by analyzing the readjusted image and is then able to readjust the sorting sequence of the entire images. Alternatively, the mobile terminal can refer to the corresponding substance as history data in response to a user's next request.

Referring to FIG. 32 (e), after the automatic sorting of the images has been completed in the mobile terminal, the sorting procedure is ended through a cancel button or a complete button.

In doing so, as mentioned in the foregoing description, the mobile terminal binds the photos, of which number exceeds the user-designated number, into a small compressed (zip) file. If the compressed file is selected, the mobile terminal can output images in the compressed file.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
    a user interface unit configured to detect a user input and a user action;
    a controller configured to generate a first gallery of a first application,
    the first gallery including a first gallery image saved in the mobile terminal, and to generate a second gallery indicative of an editing target image in response to the user input or the user action by linking the first application to a second application based on print history information including at least a print image editing list or editing factor information;
    an output unit configured to output a second gallery image of the second gallery; and
    a transmitting unit configured to transmit, to a printing device, a signal including the second gallery image and a request for printing the second gallery image,
    wherein the controller is further configured to control editing of the second gallery image using editing information used for printing the first gallery image such that the first gallery image and the second gallery image are edited with a same or similar editing factor.

2. The mobile terminal of claim 1, wherein the first application comprises a gallery application or a camera application.

3. The mobile terminal of claim 1, wherein the second application comprises at least one selected from the group consisting of a map application, a calendar application, a call application and a messenger application.

4. The mobile terminal of claim 1,
    wherein the controller controls the output unit to output, on the second gallery image, at least an editing icon or a print icon,
    wherein the editing icon is for requesting editing based on the editing information used for the first gallery image, and
    wherein the print icon is for requesting a connection to the printing device and for requesting printing of the second gallery image by the printing device.

5. The mobile terminal of claim 1, wherein the controller controls the output unit to output the second gallery image to be output according to an arrangement, a size and an outline color based on at least one selected from the group consisting of time information, printing information, location information, subject information and job information of the second gallery image.

6. The mobile terminal of claim 1,
    wherein, if a plurality of subjects are depicted in the second gallery image, the controller automatically performs an automatic tagging of each of the plurality of subjects, and
    wherein the controller collects information on a particular subject of the plurality of subjects in response to a user selection of additional tagging of the particular subject.

7. The mobile terminal of claim 6, wherein the controller is further configured to:
    generate an active album based on the second gallery image;

cause transmission of the generated active album to a mobile terminal of the particular subject based on the collected information; and select a best shot image by analyzing a response received from the mobile terminal of the particular subject.

8. The mobile terminal of claim 1, wherein, if time information is included in the second gallery image, the controller automatically activates at least a calendar application or a notebook application and then controls an image representative of the second gallery image to be output to a corresponding schedule.

9. The mobile terminal of claim 1,
wherein, if a messenger application is activated in response to a user request, the controller controls the second gallery image to be output to a prescribed region of the activated messenger application by analyzing text data input to a message, and
wherein, if the second gallery image is selected by the user, the controller controls the selected image to be automatically attached or uploaded.

10. A method of processing an image in a mobile terminal, the method comprising:
detecting a user input or a user action;
generating a first gallery of a first application, the first gallery including a first gallery image saved in the mobile terminal;
generating a second gallery indicative of an editing target image in response to the user input or the user action by linking the first application to a second application based on print history information including at least a print image editing list or editing factor information;
editing a second gallery image of the second gallery using editing information used for printing the first gallery image such that the first gallery image and the second gallery image are edited with a same or similar editing factor;
outputting the second gallery image;
generating a signal including the second gallery image and a request for printing the second gallery image; and
transmitting the generated signal to a printing device.

11. The method of claim 10, wherein the first application comprises a gallery application or a camera application.

12. The method of claim 10, wherein the second application comprises at least one selected from the group consisting of a map application, a calendar application, a call application and a messenger application.

13. The method of claim 10, further comprising:
outputting, on the second gallery image, at least an editing icon or a print icon,
wherein the editing icon is for requesting editing based on editing information used for the first gallery image, and
wherein the print icon is for requesting a connection to the printing device and for requesting printing of the second gallery image by the printing device.

14. The method of claim 10, wherein the outputting of the second gallery image comprises outputting the second gallery image according to an arrangement, a size and an outline color based on at least one selected from the group consisting of time information, printing information, location information, subject information and job information of the second gallery image.

15. The method of claim 10, further comprising:
if a plurality of subjects are depicted in the second gallery image, performing an automatic tagging of each of the plurality of subjects; and
collecting information on a particular subject of the plurality of subjects in response to a user selection of additional tagging of the particular subject.

16. The method of claim 15, further comprising:
generating an active album based on the second gallery image;
transmitting the generated active album to a mobile terminal of the particular subject based on the collected information; and
selecting a best shot image by analyzing a response received from the mobile terminal of the particular subject.

17. The method of claim 10, further comprising:
if time information is included in the second gallery image, automatically activating at least a calendar application or a notebook application and controlling an image representative of the second gallery image to be output to a corresponding schedule.

18. The method of claim 10, further comprising:
if a messenger application is activated in response to a user request, outputting the second gallery image to a prescribed region of the activated messenger application by analyzing text data input to a message; and
if the second gallery image is selected by the user, automatically attaching or uploading the selected image.

* * * * *